(12) United States Patent
Behera et al.

(10) Patent No.: US 8,738,333 B1
(45) Date of Patent: May 27, 2014

(54) CAPACITY AND LOAD ANALYSIS IN A DATACENTER

(75) Inventors: Somik Behera, San Francisco, CA (US);
Samuel P. McBride, San Jose, CA (US);
Justin Daniel Smith, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1026 days.

(21) Appl. No.: 12/786,918

(22) Filed: May 25, 2010

(51) Int. Cl.
*G06F 7/60* (2006.01)
*G06F 15/173* (2006.01)

(52) U.S. Cl.
USPC .............................................. 703/2; 709/224

(58) Field of Classification Search
USPC .............................................. 703/2; 709/224
See application file for complete search history.

(56) References Cited

U.S. PATENT DOCUMENTS

| | | | | |
|---|---|---|---|---|
| 5,848,270 | A * | 12/1998 | DeLuca et al. | 718/105 |
| 8,326,970 | B2 * | 12/2012 | Cherkasova et al. | 709/224 |
| 8,413,147 | B2 | 4/2013 | Shen et al. | |
| 8,433,802 | B2 * | 4/2013 | Head et al. | 709/226 |
| 2006/0025985 | A1 * | 2/2006 | Vinberg et al. | 703/22 |
| 2007/0006218 | A1 * | 1/2007 | Vinberg et al. | 717/174 |
| 2007/0271560 | A1 | 11/2007 | Wahlert et al. | |
| 2008/0271038 | A1 * | 10/2008 | Rolia et al. | 718/105 |
| 2012/0102291 | A1 | 4/2012 | Cherian et al. | |

* cited by examiner

*Primary Examiner* — Kandasamy Thangavelu
*Assistant Examiner* — Juan Ochoa

(57) ABSTRACT

One or more embodiments provide methods of creating datacenter capacity and/or load models for a datacenter in a virtualized environment; methods of simulating the capacity and/or load models ("What-if" simulations); and methods of visualizing simulation results for assessing the impact of the capacity and/or load models on the datacenter capacity.

22 Claims, 34 Drawing Sheets

New virtual machine configuration
Specify the configuration and projected capacity usage of new virtual machines

| | |
|---|---|
| Change Type | Virtual machine count: 1 |
| Scenario | Specify new virtual machines |
| Configuration | Configuration: Utilization |
| View | vCPU: 1 ▷ X 2.4 GHz ▷ 13 % |
| Ready to Complete | Memory: 2048 MB ▷ 32.48 % |

VM Population smcbr-esx.eng.vmware.com
 vCPU: 10 CPU Cores at 0.56GHz Usage
 vMEM: 11.75GB at 4.37GB Usage

Small VM size
 vCPU: 1 vCPU at - % Utilization
 vMEM: 1GB at - % Utilization
 Virtual Machines: 3

Medium VM size
 vCPU: 1 vCPU at 13% Utilization
 vMEM: 2GB at 32.48% Utilization
 Virtual Machines: 3

Large VM size

Host Population

| | CPU | Memory |
|---|---|---|
| Smallest | 4 x 2.4GHz | 8GB |
| Largest | 4 x 2.4GHz | 8GB |

Help    < Back   Next >   Cancel

□ What-if scenario

Ready to Complete
Review selections

Change Type

Scenario

Configuration

View

Ready to Complete

Scenario Type
Add virtual machine(s)

What-if scenario configuration
Adding 1 virtual machine(s) with the following configuration:

| CPU: | 1 x 2.4 GHz |
|---|---|
| CPU Utilization: | 13% |
| Memory: | 2048 MB |
| Memory Utilization: | 32.48% |

Resulting view
Virtual Machine Capacity - Summary

[Help]  [< Back]  [Finish]  [Cancel]

What-if scenario

Select virtual machine sample population
Select existing virtual machines to use as reference profiles for new virtual machines

| | |
|---|---|
| Change Type | Select virtual machines to add to the target cluster or host. Though the virtual machines will not actually be moved from their original locations, Capacity IQ can simulate adding these machines to the cluster or host. |
| Scenario | Datacenter: Palo Alto Eng    Cluster or Host: All Clusters/Hosts |
| Configuration | |

| | Name | vCPU Total | | All Clusters/Hosts | % |
|---|---|---|---|---|---|
| | | | | smcbr-esx.eng.vmware.com | |
| VM Count | ☐ smcbr-ciq-demo | 1 x 2.4 GHz | | | |
| | ☑ smcbr-ciq-va | 1 x 2.4 GHz | 5% | 2048 MB | 19% |
| | ☐ smcbr-col2x | 1 x 2.4 GHz | | 1024 MB | |
| View | ☐ smcbr-cp | 1 x 2.4 GHz | | 1024 MB | |
| | ☐ smcbr-db | 1 x 2.4 GHz | | 512 MB | |
| Ready to Complete | ☑ smcbr-desktop | 1 x 2.4 GHz | 11% | 2048 MB | 27% |
| | ☐ smcbr-fedora12 | 1 x 2.4 GHz | | 2048 MB | |
| | ☐ smcbr-suse11 | 2 x 2.4 GHz | | 256 MB | |
| | ☐ smcbr-w2k3 | 1 x 2.4 GHz | | 1024MB | |

Number of VMs Selected: 2

Host Population

| | CPU | Memory |
|---|---|---|
| Smallest | 4 x 2.4GHz | 8GB |
| Largest | 4 x 2.4GHz | 8GB |

[ Help ]      [ < Back ] [ Next > ]  [ Cancel ]

What-if scenario

Specify mix of new virtual machines to be added
Enter number of virtual machines of each profile in mix

| | Review the list of machines selected. Increase the multiplier to create more than one of any machine. |
|---|---|
| Change Type | |
| Scenario | |
| Configuration | |
| VM Count | |
| View | |
| Ready to Complete | |

| VM Count | Name △ | vCPU Total | CPU Util | Mem Total | Mem Util |
|---|---|---|---|---|---|
| 1 | smcbr-ciq-va | 1 x 2.4 GHz | 5% | 2048 MB | 20% |
| 21 | smcbr-desktop | 1 x 2.4 GHz | 8% | 2048 MB | 26% |

⏮ ◀ [1] /1 ▶ ⏭

Host Population

| | CPU | Memory |
|---|---|---|
| Smallest | 4 x 2.4GHz | 8GB |
| Largest | 4 x 2.4GHz | 8GB |

[Help]   [< Back]  [Next >]  [Cancel]

What-if scenario

Ready to Complete
Review Selections

Change Type

Scenario

Configuration

VM Count

View

Ready to Complete

Scenario Type
Add virtual machine(s)

What-if scenario configuration
Adding 2 virtual machine(s) with the following configuration:

| Profile name | Multiplier | CPU | Memory |
|---|---|---|---|
| smcbr-ciq-va | 1 | 1 x 2,400 MHz | 2,048 MB |
| smcbr-desktop | 1 | 1 x 2,400 MHz | 2,048 MB |

Resulting view
Virtual Machine Capacity - Summary

Help          < Back    Finish    Cancel

What-if scenario

Select virtual machine sample population
Select a set of virtual machines to include in the virtual machine sample population

| | |
|---|---|
| Change Type | Select virtual machines to remove from the target cluster or host. Though the virtual machines will not actually be removed from their original locations, Capacity IQ can simulate adding these machines to the cluster or host. |
| Scenario | |
| Configuration | |
| View | |
| Ready to Complete | |

| ☐ Name △ | vCPU Total | CPU Util | Mem Total | Mem Util |
|---|---|---|---|---|
| ☑ 🖳 smcbr-ciq-demo | 1 x 2.4 GHz | 13% | 2048 MB | 35% |
| ☑ 🖳 smcbr-ciq-va | 1 x 2.4 GHz | 5% | 2048 MB | 19% |
| ☐ 🖳 smcbr-col2x | 1 x 2.4 GHz | | 1024 MB | |
| ☐ 🖳 smcbr-cp | 1 x 2.4 GHz | | 1024 MB | |
| ☐ 🖳 smcbr-db | 1 x 2.4 GHz | | 512 MB | |
| ☐ 🖳 smcbr-desktop | 1 x 2.4 GHz | 5% | 2048 MB | 26% |
| ☐ 🖳 smcbr-fedora12 | 1 x 2.4 GHz | | 2048 MB | |
| ☐ 🖳 smcbr-suse11 | 2 x 2.4 GHz | | 256 MB | |
| ☐ 🖳 smcbr-w2k3 | 1 x 2.4 GHz | | 1024MB | |

◁ ◀ [1] /1 ▷ ▶

Number of VMs Removed: 2

Host Population

| | CPU | Memory |
|---|---|---|
| Smallest | 4 x 2.4GHz | 8GB |
| Largest | 4 x 2.4GHz | 8GB |

[ Help ]　　　　　　　　　　　　　　　　　　　[ < Back ] [ Next > ] [ Cancel ]

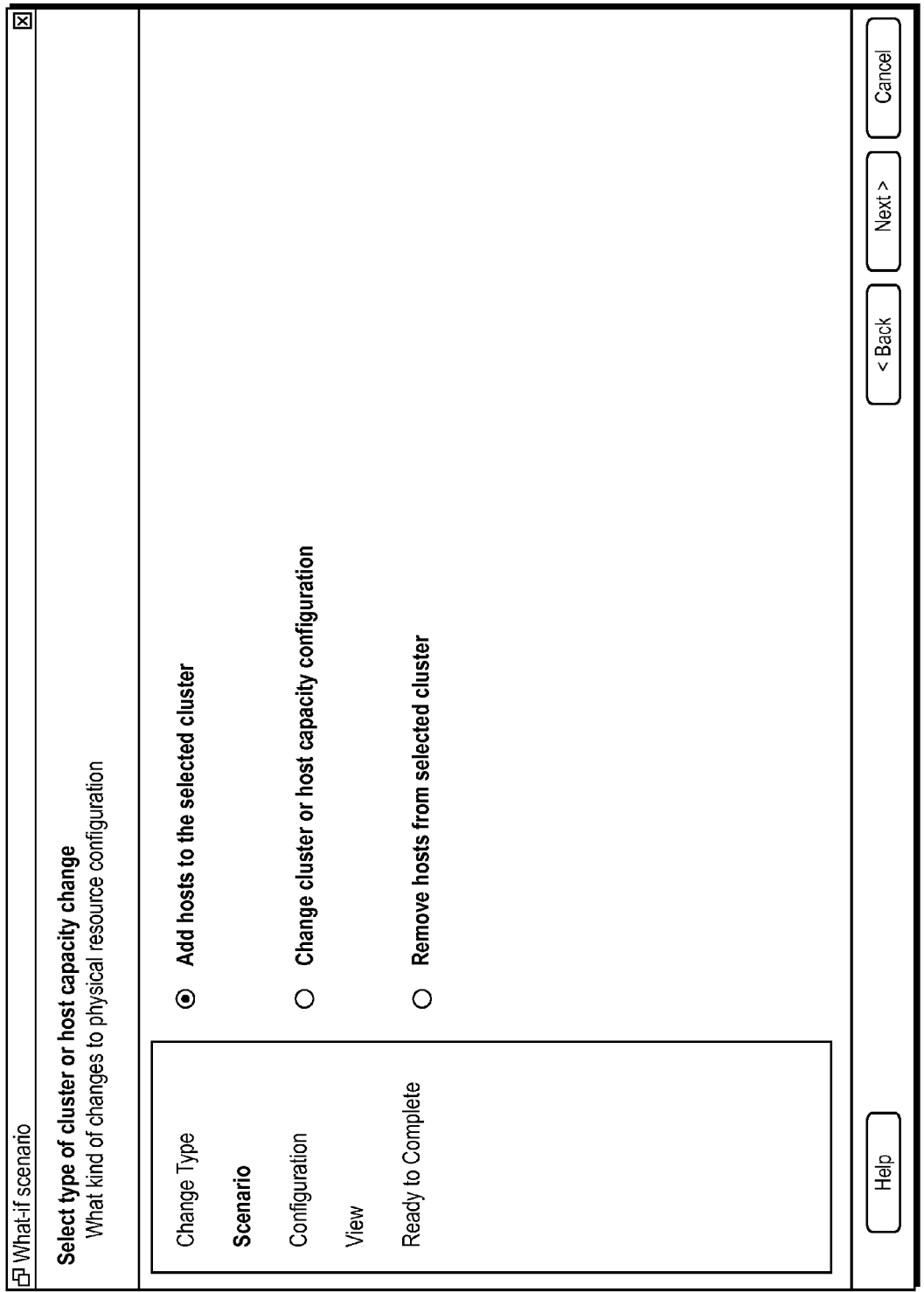

What-if scenario

New hardware configuration
Specify the configuration of new Hosts

| Change Type | Specify configuration of new Hosts. Use the reference statistics as a guide. |
| Scenario | Number of hosts to add: 1 |
| Configuration | Provide each host with the following configuration: |
| View | Host configuration |
| Ready to Complete | CPU: 2 × 2 GHz |
| | Memory: 32 GB |

Cluster Population

M3cluster-0
- CPU: 8 CPU Cores at - GHz Usage
- MEM: 127.99GB at - GB Usage

M3host-0
- CPU: 2 x 2GHz at - % Usage
- MEM: 32GB at - % Usage
- Virtual Machines: 10

M3host-1
- CPU: 2 x 2GHz at - % Usage
- MEM: 32GB at - % Usage
- Virtual Machines: 10

M3host-2

VM Population

| | vCPU | vMemory |
|---|---|---|
| Smallest | 1 x 2GHz | 0.5GB |
| Largest | 1 x 2GHz | 0.5GB |

[Help]  [< Back] [Next >] [Cancel]

What-if scenario

Replacement hardware configuration
Specify new configuration for the cluster

| | |
|---|---|
| Change Type | Specify new configuration for the cluster. Use the reference statistics as a guide. |
| Scenario | Change number of hosts to: [4] |
| Configuration | |
| View | Provide each host with the following configuration: |
| Ready to Complete | Host configuration<br>CPU: [2 ▽] X [2] [GHz ▽]<br>Memory: [32] [GB ▽] |

Cluster Population

M3cluster-0
   CPU:    8 CPU Cores at - GHz Usage
   MEM:  127.99GB at - GB Usage M3host-0
   CPU:    2 x 2GHz at - % Utilization
   MEM:  32GB at - % Utilization
   Virtual Machines: 10

M3host-1
   CPU:    2 x 2GHz at - % Utilization
   MEM:  32GB at - % Utilization
   Virtual Machines: 10

M3host-2

VM Population

| | vCPU | vMemory |
|---|---|---|
| Smallest | 1 x 2GHz | 0.5GB |
| Largest | 1 x 2GHz | 0.5GB |

[Help]  [< Back] [Next >] [Cancel]

What-if scenario

Select hardware for analysis
Select a set of physical hosts to include in the sample population Change Type Scenario

Configuration

View

Ready to Complete

| Name | CPU Total | CPU Util | Mem Total | Mem Util |
|---|---|---|---|---|
| ☐ M3host-0 | 2 x 2.0 GHz | | 32 MB | |
| ☑ M3host-1 | 2 x 2.0 GHz | | 32 MB | |
| ☐ M3host-2 | 2 x 2.0 GHz | | 32 MB | |
| ☑ M3host-3 | 2 x 2.0 GHz | | 32 MB | |

Number of hosts selected: 2

VM Population

| | vCPU | vMemory |
|---|---|---|
| Smallest | 1 x 2GHz | 0.5GB |
| Largest | 1 x 2GHz | 0.5GB |

[ Help ]    [ < Back ]  [ Next > ]  [ Cancel ]

CAPACITY AND LOAD ANALYSIS IN A DATACENTER

TECHNICAL FIELD

One or more embodiments of the present invention relate to methods of creating capacity and/or load models for a datacenter in a virtualized environment, to methods of simulating the capacity and/or load models ("What-if" simulations), and to methods of visualizing simulation results for assessing the impact of the capacity and/or load models on datacenter capacity.

BACKGROUND

Modern datacenters take various forms. Some datacenters are permanent installations consisting of large floor plans having row after row of racks full of blade servers, some of which permanent installations are over a football field in length. Other datacenters are "truckable" datacenters that are built from equipment shipped in containers. In either case, a typical datacenter involves thousands of servers. For example, at a density of up to 128 blade servers per fully loaded rack, an average sized corporate conference room could hold about 3000 servers.

The job of a datacenter administrator is to deliver the "right" capacity at the "right" time—whenever and however it is needed. Managing or monitoring virtual machines ("VMs") or workload in the datacenter is a tedious and time consuming task. As such, it requires a lot of time, resources and discipline. In particular, the ease of deploying VMs can result in VM sprawl and inefficient use of virtual capacity. Thus, in a dynamic environment, delivering the "right" capacity at the "right" time can be very difficult. Hence, without the "right" tools, a datacenter environment may not be fully optimized.

Virtualization, while optimizing physical resource usage, makes the process of estimating optimum capacity (for example, CPU, Memory, Disk and bandwidth) requirements of any workload non-trivial. Traditional capacity planning tools have relied on a 1-1 mapping between compute/storage capacity and compute workload, but virtualization enables multiple compute workloads to be mapped to the same physical compute resource. In addition, other technologies such as "High Availability" ("HA") technology, "Distributed Resource Scheduler" ("DRS") technology, and "Fault Tolerance" ("FT") technology provided by VMware, Inc. of Palo Alto, Calif. also impact capacity requirements of a particular workload and make capacity planning challenging and unreliable.

To mitigate risk, as well as plan for future growth, managers typically provision capacity higher than highest peak of actual capacity needs. The difference between provisioned capacity and a demand peak is deemed acceptable headroom and a demand valley is acknowledged as waste. Thus, in information technology ("IT") management there is a physical capacity management dilemma; namely, efficiency and predictability are conflicting objectives. Specifically, under-provisioning relates to high efficiency, but high risk, whereas, over-provisioning leads to high inefficiency and unnecessary waste.

Capacity management methods in the prior art typically use a "Rule of Thumb" based on "guesstimates" or tacit knowledge. A problem with this approach is that such methods are subjective, are prone to experiential bias, and, to be safe, are overly conservative. In addition, some homegrown methods use a Microsoft® Office Excel® spreadsheet or an SQL/Perl script. A problem with this approach is that the homegrown methods are time-consuming to build, maintain, prepare and analyze, and they only provide a static snapshot in time.

SUMMARY

One or more embodiments of the present invention solve one or more of the above-identified problems by providing methods of creating datacenter capacity and/or load models for a datacenter in a virtualized environment; methods of simulating the capacity and/or load models ("What-if" simulations); and methods of visualizing simulation results for assessing the impact of the capacity and/or load models on the datacenter capacity. In particular, one embodiment of the present invention is a method of simulating a capacity and/or load model in a virtualized environment for a capacity container, which method comprises: (a) creating a capacity and/or load model; (b) collecting existing server and virtual machine (VM) attributes for the capacity container, which attributes include measures of capacity utilization; (c) providing a first and second set of historical data for each of a user-selected number of user-selected time intervals prior to and ending at a predetermined time wherein: (i) data for the first set in each interval comprises a measure of total capacity in the capacity container in units which are a measure of the number of VMs that can be deployed in the capacity container, and (ii) data for the second set in each interval comprises a measure of total capacity utilization in the capacity container in units which are a measure of the number of VMs that cause capacity utilization in the capacity container; (d) fitting the first and second sets of historical data to provide a first and a second trend curve; and (e) visualizing the first and second trend curves.

BRIEF DESCRIPTION OF THE DRAWINGS

FIG. 6 shows a screenshot that may be used to specify the attributes of the additional, custom-configured VMs that are to be added to a capacity container, which attributes include, for example and without limitation, the number of VMs, the number of virtual CPUs (vCPU) for the VMs; the CPU speed in GHz; the expected percentage of CPU demand; and the amount of virtual memory (vMEM) in MB, and the expected virtual memory consumed.

FIG. 9 shows a screenshot that presents a summary of the user input for the What-if scenario configuration.

FIG. 11 shows a screenshot that may be used to select VM attributes for use in adding VMs to a capacity container, where the added VMs represent capacity load.

FIG. 12 shows a screenshot that may be used to specify multipliers associated with custom VMs.

FIG. 13 shows a screenshot that presents a summary of the user input for the What-if scenario configuration.

FIG. 14 shows a screenshot that may be used to select VMs to be removed from a capacity container.

FIG. 16 shows a screenshot that may be used to specify the type of host changes that are to be modeled.

FIG. 17 shows a screenshot that may be used to specify the attributes of the additional, custom-configured servers that are to be added to a capacity container.

FIG. 19 shows a screenshot that may be used to specify the new configuration for a cluster using reference statistics as a guide.

FIG. 21 shows a screenshot that may be used to select physical servers to remove.

DETAILED DESCRIPTION

Figure 1A:
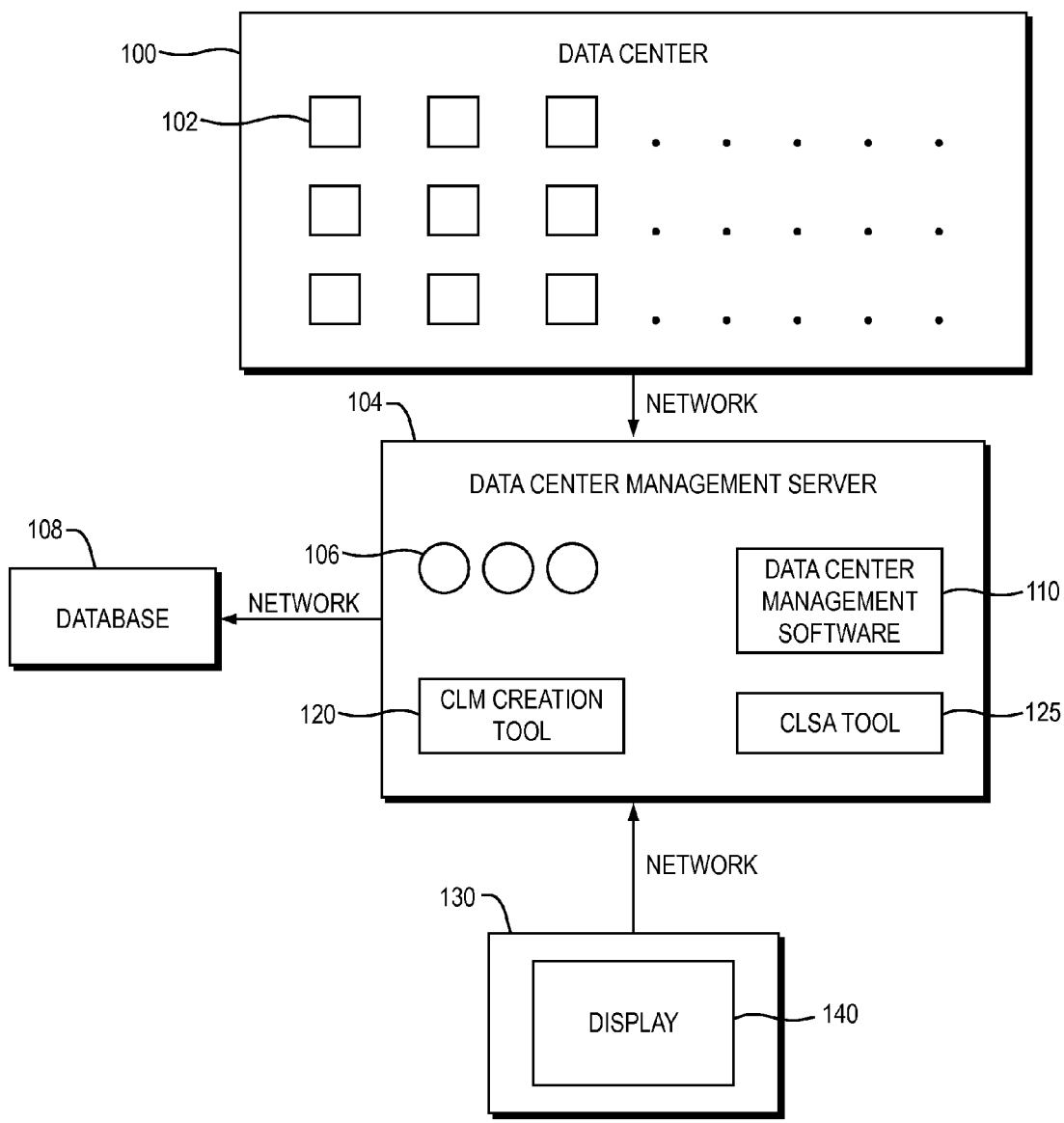
FIG. 1A is a block diagram of a datacenter management system ("DMS") used to collect data from objects in the datacenter in accordance with one or more embodiments of the present invention.
Figure 1B:
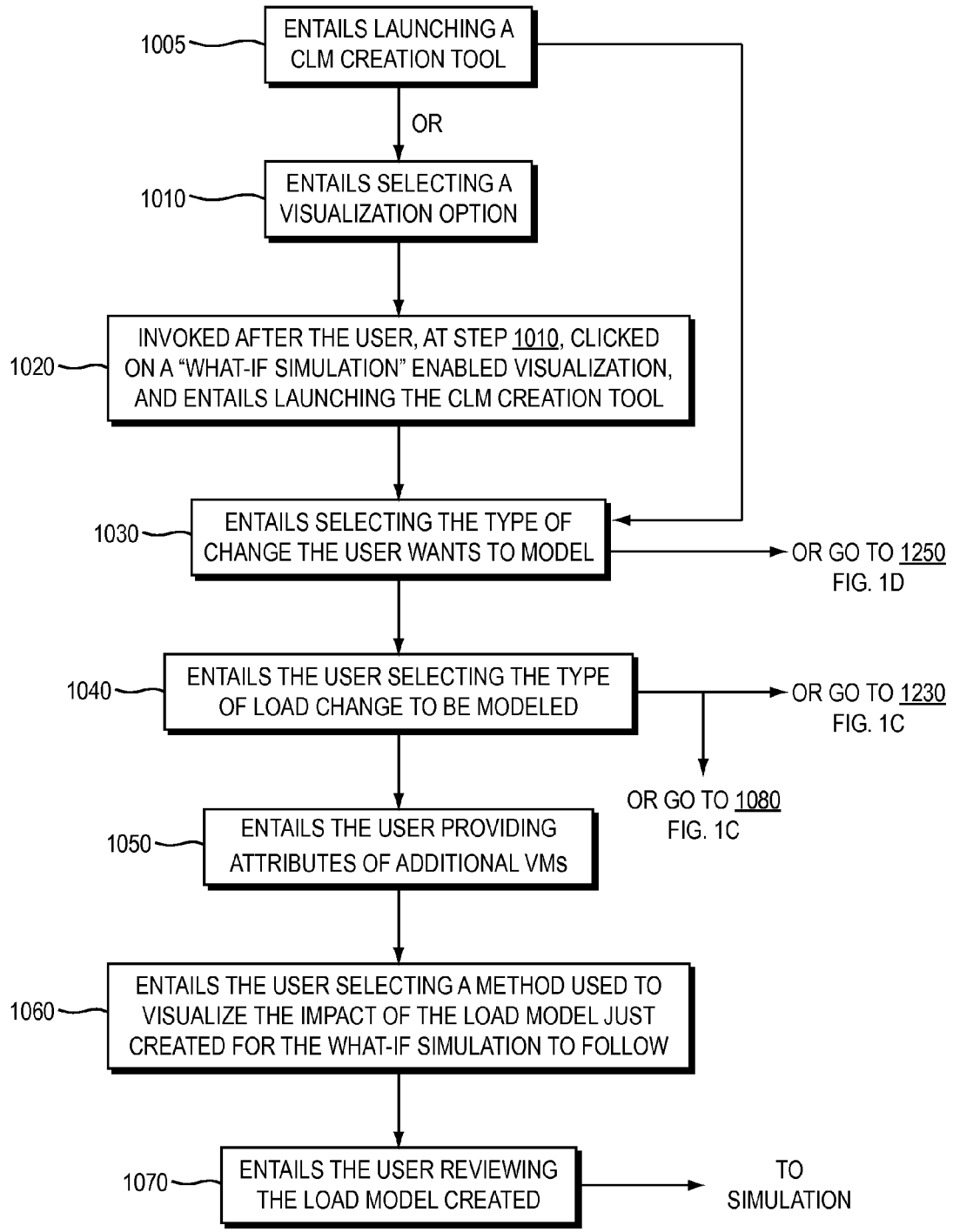
FIGS. 1B-1E show a flowchart of steps entailed in using a Capacity and/or Load Model ("CLM") creation tool wizard.
Figure 1C:
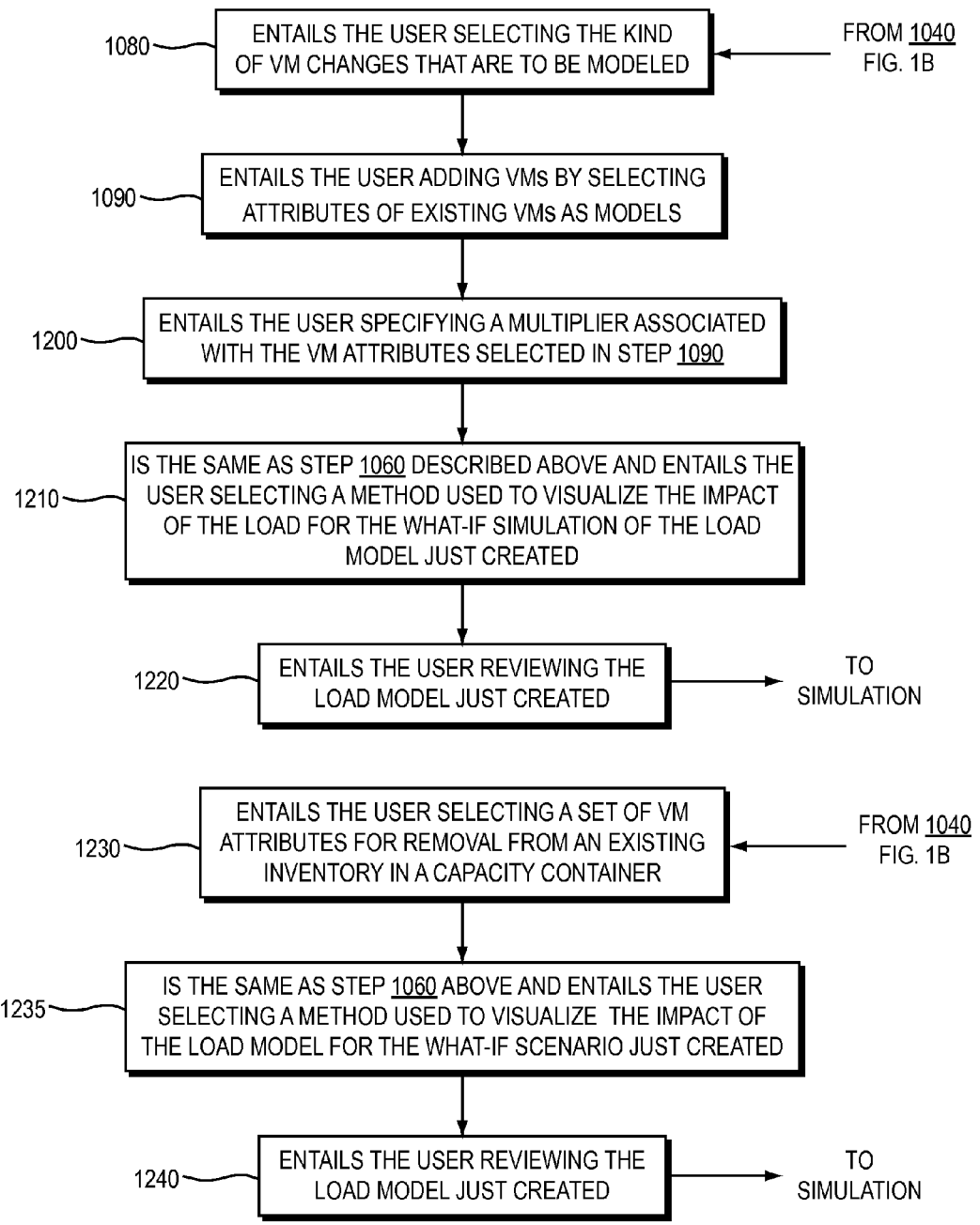
Figure 1D:
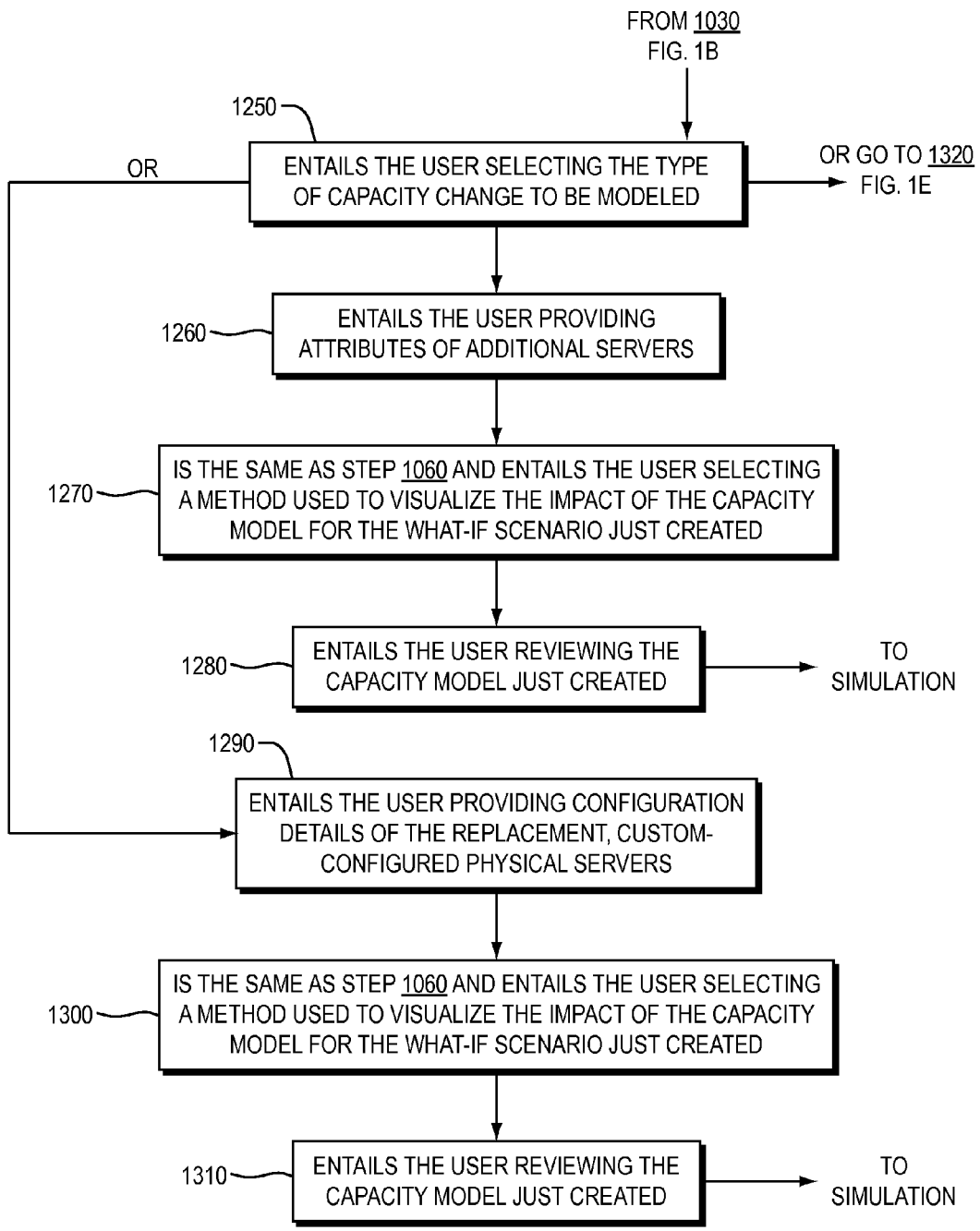
Figure 1E:
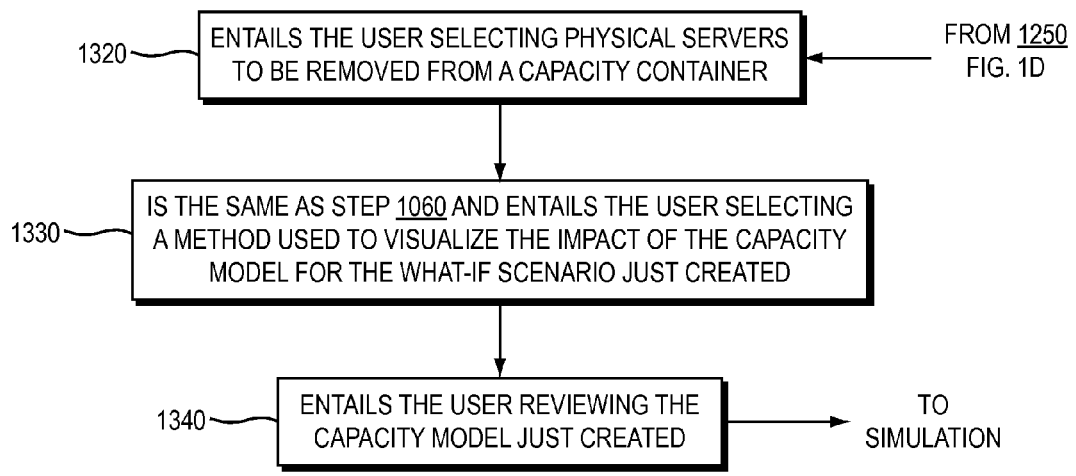

One or more embodiments of the present invention provide methods of creating capacity and/or load models for a capacity container (for example and without limitation, a datacenter) in a virtualization environment; one or more embodiments of the present invention provide methods of simulating the capacity and/or load models ("What-if" simulation); and one or more embodiments of the present invention provide methods of visualizing simulation results to assess the impact of the capacity and/or load models on the capacity container. In accordance with one or more such embodiments, a Capacity and/or Load Model ("CLM") creation tool provides a wizard-based workflow that enables capacity planning in a virtualized environment by generating a capacity and/or load model in response to user input. In addition, and in accordance with one or more further embodiments of the present invention, a Capacity and Load Simulation and Analysis ("CLSA") tool simulates the capacity and/or load model, and in accordance with one or more further such embodiments, the CLSA tool simulates while taking into account features like "Fault Tolerance" ("FT") and "High Availability" ("HA") that are provided by datacenter management software from VMware, Inc. of Palo Alto, Calif. VMware FT entails running a virtual machine ("VM") and a corresponding shadow VM on a different physical server. Therefore resource consumption of an "FT VM" can be twice as much as that for a "non-FT VM." In case of physical server failures, VMware HA enables a VM to be restarted on a different physical server. From a capacity planning perspective, this means that one should reserve sufficient CPU/MEM capacity in a cluster of servers so that the cluster can handle an "HA-enabled VM" in case of a physical server failure. In addition, and in accordance with one or more embodiments of the present invention, the CLSA tool provides visualization of the impact (from a capacity planning perspective) of the capacity and/or load model.

Using one or more embodiments of the present invention, a user, for example and without limitation, a datacenter manager or an information technology ("IT") manager can measure the impact (for example and without limitation, as to VM count capacity) of creating and simulating a load model (referred to as a load model because there is a change in the load of a capacity container—for example, adding VMs to a server increases the load thereon) that is generated by: (a) adding VMs to a capacity container where the added VMs have user-specified configurations and demand and consumption profiles; (b) adding VMs to a capacity container where the added VMs have configurations and demand and consumption profiles of user-specified existing VMs in a database accessible by the CLM creation tool (i.e., the user-specified existing VMs may be in the capacity container for which the model is being created or they may be outside of that capacity container); or (c) removing user-specified VMs from a capacity container. As used herein, a capacity container is, for example and without limitation, a datacenter, a physical server, a cluster of physical servers (also referred to herein as a cluster of "hosts") or a "virtualized resource pool." As also used herein, the term "virtualized resource pool" refers to an abstraction of, for example and without limitation, a group of physical machines (for example, servers), where the abstraction comprises adding or "pooling" the resources of the group of physical machines. Thus, for example, the number of CPUs for each physical machine would be added to provide a CPU capacity for the virtualized resource pool, the amount of data storage for each physical machine would be added to provide a datastore capacity for the virtualized resource pool, and so forth. Thus, using one or more embodiments of the present invention, the user can measure the impact of creating and simulating a load model in the manner described in detail below.

In addition to the above, using one or more embodiments of the present invention, a user can measure the impact (for example and without limitation, as to VM count capacity) of creating and simulating a capacity model (referred to as a capacity model because there is a change in the capacity of the container—for example, adding servers to a cluster increases the capacity of the cluster) that is generated by: (a) adding hosts (i.e., servers) to a capacity container where the added hosts have user-specified configurations; (b) replacing hosts in a capacity container where the replacement hosts have user-specified configurations; or (c) removing user-specified hosts from the capacity container. Thus, using one or more such embodiments of the present invention, the user can measure the impact of creating and simulating a capacity model in the manner described in detail below.

In addition, as will be described below, and in accordance with one or more embodiments of the present invention, visualization of a trend after carrying out a "What-if" simulation provides a forecasted simulation. In further addition, and in accordance with one or more such embodiments, the CLSA tool further enables the user to compare multiple "What-if" simulation scenarios, for example and without limitation, on the same visualization or display, using, for example and without limitation, lines comprised of various patterns (for example and without limitation, in varying colors and various types of dotted lines), where each pattern represents a distinct "What-if" scenario. In further addition, and in accordance with one or more such embodiments, the CLSA tool enables the user to combine multiple "What-if" simulations to represent the combined impact of multiple capacity and/or load models.

Datacenter Data Collection

FIG. 1A is a block diagram showing datacenter management system 1000 (DMS 1000) that, among other things, collects data from objects in datacenter 100. As shown in FIG. 1A, datacenter 100 is a collection of many objects, including computing resources. For example and without limitation, computing resource 102 in datacenter 100 may be a physical computer system, a virtual computer system (also referred to as a virtual machine (VM)), a network switch, a storage system, or any other resource that is needed to operate datacenter 100. As further shown in FIG. 1A, datacenter management server 104 runs datacenter management software 110 (DMS 110), for example and without limitation, VMware vSphere™ 4 software which is available from VMware, Inc. of Palo Alto, Calif. or Microsoft System Center™ software which is available from Microsoft Corporation of Redmond, Wash. As shown in FIG. 1A, datacenter management server 104 is connected to datacenter 100 over a network connection, for example and without limitation, a private network connection. DMS 110, among other things, collects performance data from the objects in datacenter 100 (for example and without limitation, computer resource 102)—such performance data typically includes the date and time the data was gathered. The performance data is collected from various objects in datacenter 100, for example and without limitation, virtual machines ("VMs"), physical hosts (i.e., servers), and the performance data includes, for example and without limitation: (a) physical CPU utilization, physical memory utilization; (b) data from which virtual CPU ("vCPU") demand percentages for vCPUs in a VM can be determined, i.e., determined as demand divided by configured vCPU demand capacity (in accordance with one or more embodiments of the present invention, for a vCPU: (i) demand is equal to the time during which the physical CPU is executing instructions for the vCPU plus the amount of time the vCPU is in a "ready" state (i.e., a state where the vCPU has work to do but has to wait for access to a physical CPU)—the demand may be reported in units of time or in units of the number of CPU clock "ticks" used in executing instructions measured, for example and without limitation, in MHz or GHz; and (ii) configured vCPU demand capacity is equal, for example and without limitation, to the total speed, in clock "ticks," of the vCPU); (c) data from which virtual memory ("vMemory") consumption percentages of vMemory can be determined, i.e., determined as consumption divided by configured vMemory (in accordance with one or more embodiments of the present invention, for a vMemory: (i) consumption is equal to the amount of utilization of guest physical memory in a VM minus the amount of memory used by the virtualization software for "memory ballooning" and "memory sharing" (as is known to those of ordinary skill in the art, these refer to methods of memory management provided by software available from VMware, Inc. of Palo Alto, Calif.) plus the amount of memory used as overhead by the virtualization software; and (ii) configured vMemory is equal, for example and without limitation, to the total size of vMemory, for example and without limitation in GB); and so forth. In accordance with one or more embodiments of the present invention, DMS 110 continuously collects performance data approximately every minute. In addition, DMS 110 stores the performance data in database 108 along with configuration information for the objects. Such configuration information includes, for example and without limitation, CPU and memory resources allocated to VMs of a server; CPU and memory resources allocated to servers; servers allocated to clusters of servers; and servers and clusters allocated to a datacenter. In further addition, DMS 110 running on datacenter management server 104 may periodically query each of its managed objects to retrieve data. To do this, for example and without limitation, DMS 110 may use one or more agents (for example agent 106 shown in FIG. 1A) to provide access for DMS 110 to a particular type of computing resource. Alternatively, agents can be installed in certain types of datacenter objects, and the installed agents will send data to DMS 110 periodically or at predetermined times. As shown in FIG. 1A, datacenter management server 104 accesses database 108, for example and without limitation, over a network connection, for example and without limitation, a private network connection. For example and without limitation, database 108 may be a relational database management system or any data store that is capable of storing data that can be retrieved using any one of a number of methods that are well known to those of ordinary skill in the art.

In accordance with one or more embodiments of the present invention, the CLM creation tool and the CLSA tool are software that runs in a computer system that may be inside or outside datacenter 100. For example and without limitation, as shown in FIG. 1A, CLM creation tool 120 and CLSA tool 125 may run on datacenter management server 104. Alternatively, (a) CLM creation tool 120 and CLSA tool 125 may run on any computing resource that can access database 108, for example and without limitation, over a network connection, for example and without limitation, a private network connection; or (b) CLM creation tool 120 and CLSA tool 125 may run on any computer resource that can import data obtained, for example and without limitation, from database 108.

In accordance with one or more embodiments of the present invention, and using any one of a number of methods that are well known to those of ordinary skill in the art, CLM creation tool 120 and CLSA tool 125 accesses data in database 108 for use in the manner that will be described in detail below.

In accordance with one or more embodiments of the present invention, a user connects to CLM creation tool 120 and CLSA tool 125 over a private network connection using a browser in accordance with any one of a number of methods that are well known to those of ordinary skill in the art. In response, and in accordance with one or more such embodiments, CLM creation tool 120 and CLSA tool 125 interact with the user through a user interface (UI) in accordance with any one of a number of methods that are well known to those of ordinary skill in the art. In accordance with one or more such embodiments, the user uses a computing resource with a display (shown in FIG. 1A as computer 130 with display 140) such as a desktop computer, a laptop computer, or a mobile device such as, for example and without limitation, a Smartphone to interact with the UI provided by CLM creation tool 120 and CLSA tool 125. In any event, CLM creation tool 120 and CLSA tool 125 scales the display in accordance with any one of a number of methods that are well known to those of ordinary skill in the art to take into account the form factor of the particular device used.

Datacenter Capacity Model Creation

One or more embodiments of the present invention provide methods of creating capacity and/or load models for What-if simulation. FIGS. 1B-1E show a flowchart of steps entailed in using the CLM creation tool wizard, which steps are described below.

Step 1005 of one embodiment of the inventive method entails launching the CLM creation tool.

Figure 1F:
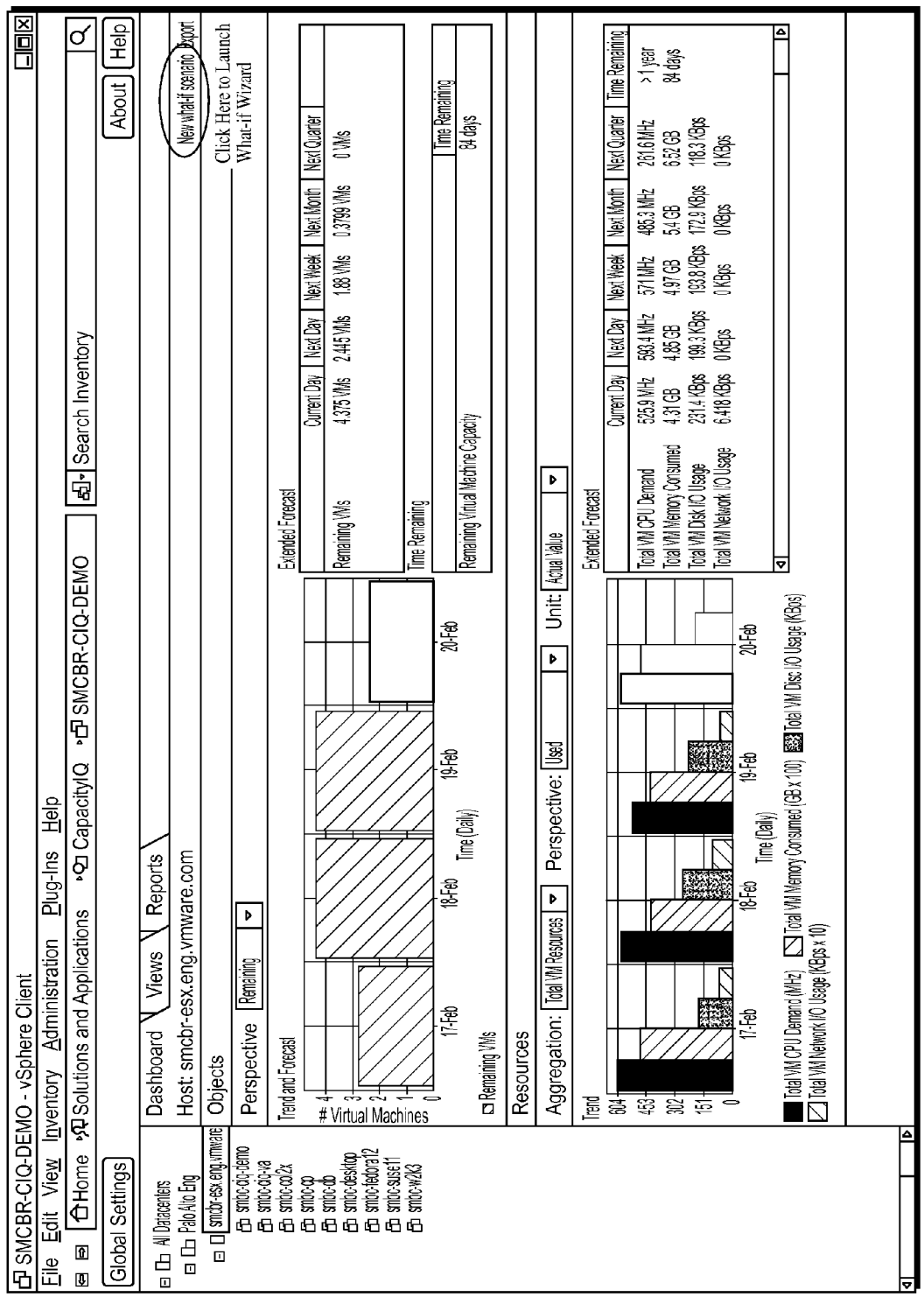
FIG. 1F shows a screenshot that enables a user, for example and without limitation, a datacenter administrator or an information technology ("IT") manager to launch the CLM creation tool wizard.

In order to carry out one or more of the actions described in detail below, the CLM creation tool will collect server and VM configurations for a capacity container, which configurations are available by accessing database 108 or by requesting such information from DMS 110 in accordance with any one of a number of methods that are well known to those of ordinary skill in the art. FIG. 1F shows a screenshot that enables a user, for example and without limitation, a datacenter administrator or an information technology ("IT") manager to select a CLM creation tool wizard. At step 1005, the user selects a capacity container for which a capacity and/or load model will be created by clicking on an icon representing a desired capacity container from a list of capacity containers displayed in the left-hand panel of the screenshot. In accordance with one or more embodiments of the present invention, a capacity container is, for example and without limitation, a datacenter, a physical server, a cluster of servers (also referred to herein as a cluster of hosts) or a "virtualized resource pool." Then, the user clicks the "New What-if Scenario" link shown in FIG. 1F on the upper right-hand portion of the screenshot (see the caption "Click Here to Launch What-if Wizard" in FIG. 1F), and control is transferred to step 1030 of the embodiment of the inventive method. Alternatively, if the user clicks the "Views" tab shown in FIG. 1F instead of clicking the "New What-if Scenario" link, control is transferred to step 1010 of the embodiment of the inventive method.

Figure 2:
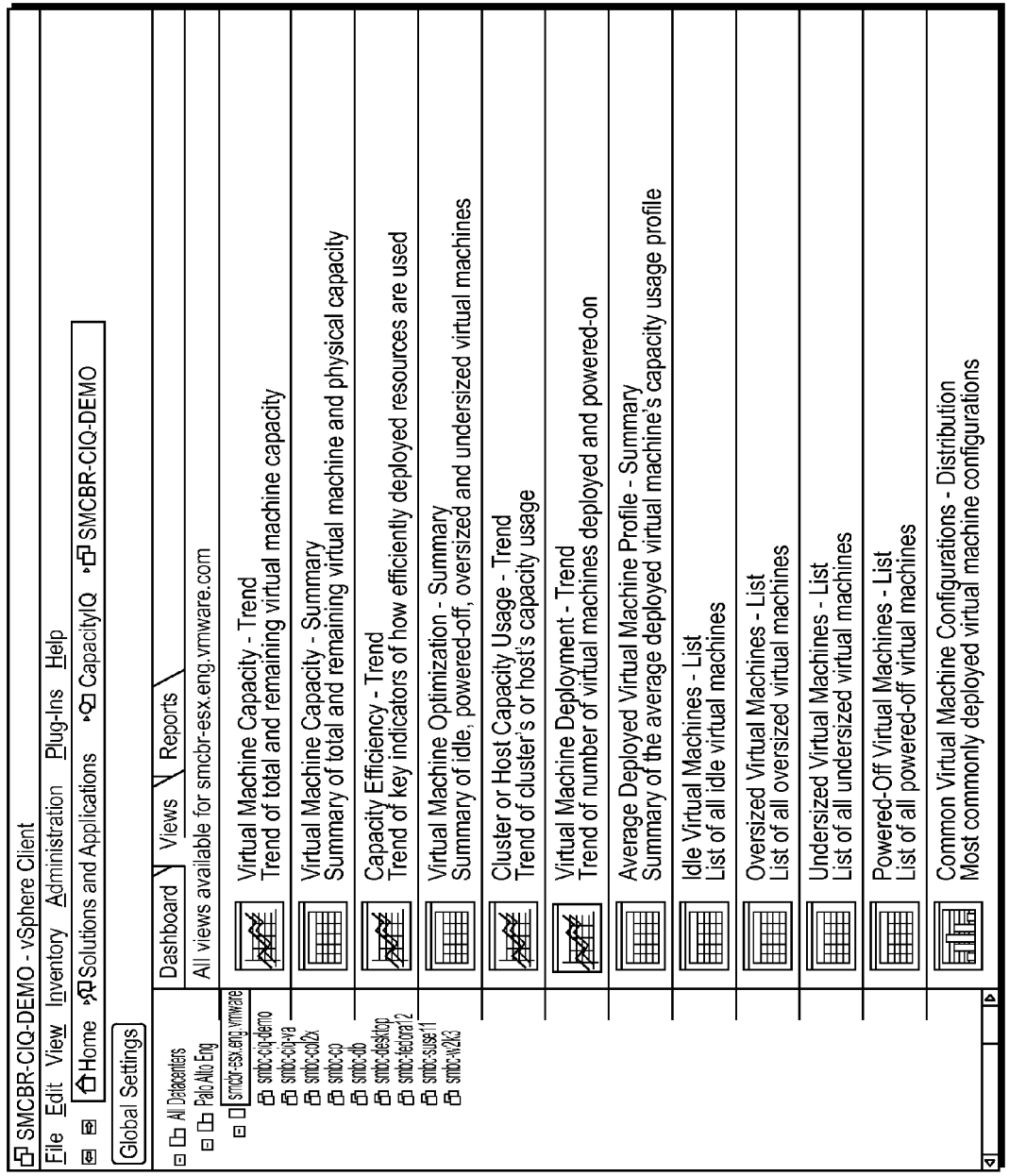
FIG. 2 shows a screenshot that lists visualization options available in accordance with one or more embodiments of the present invention.

Step 1010 of the embodiment of the inventive method entails selecting a visualization option. At step 1010, the screenshot shown in FIG. 2 is presented to the user. FIG. 2 shows a screenshot that lists visualization options available in accordance with one or more embodiments of the present invention. At step 1010, the user selects a capacity container from those listed in the left-hand panel, and selects a visualization option having a "What-if Simulation" feature enabled by clicking on one of the visualization options listed in the right-hand panel. In accordance with this embodiment, the visualization options entitled "Virtual Machine Capacity—Trend" and "Virtual Machine Capacity—Summary" are "What-if Simulation" enabled (i.e., upon selecting these visualization options, control is transferred to step 1020 to be able to launch the CLM creation tool). Control is then transferred to step 1020 of the embodiment of inventive method.

Figure 3:
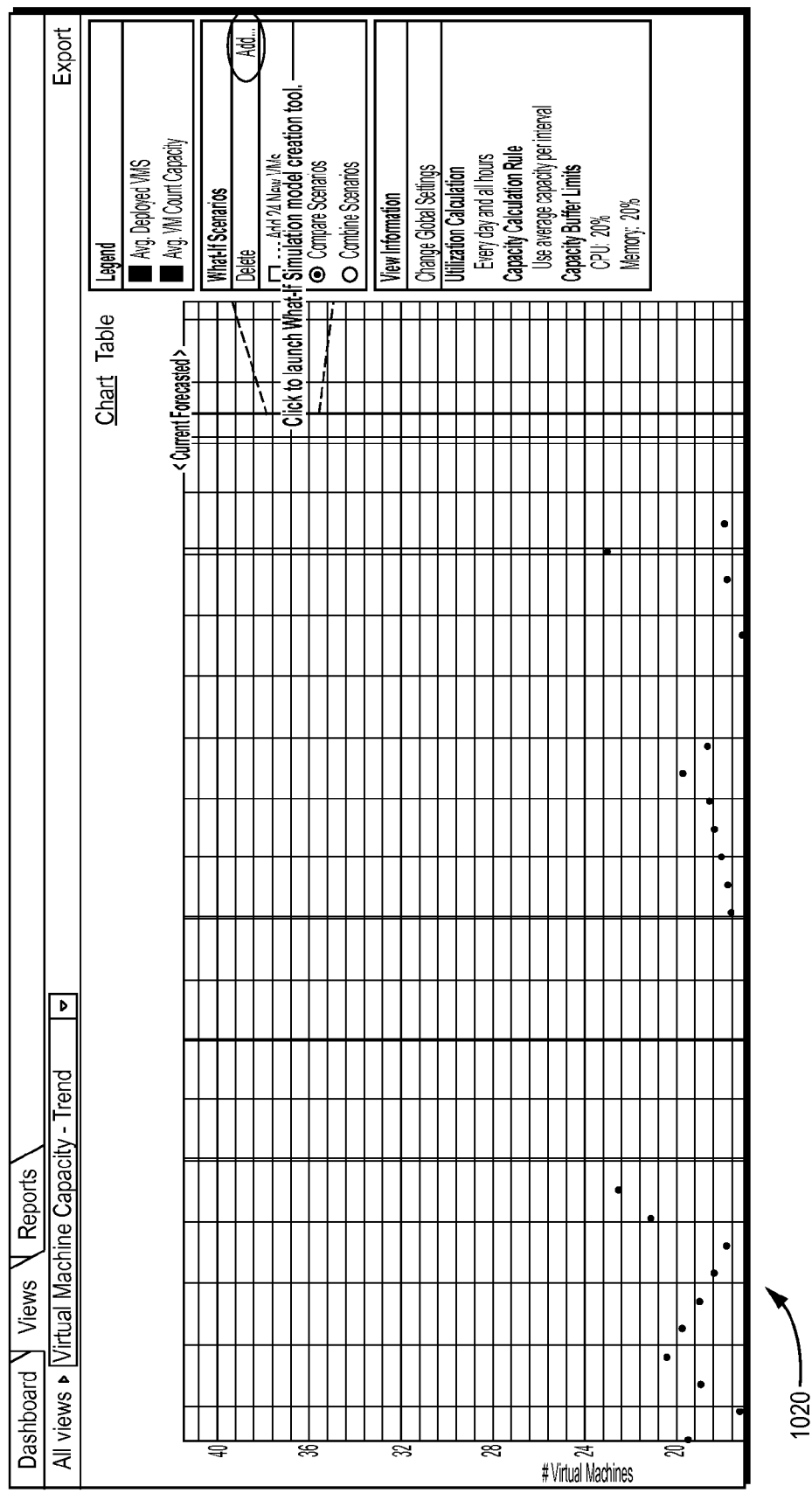
FIG. 3 shows a screenshot that enables the user to launch a CLM creation tool that is fabricated in accordance with one or more embodiments of the present invention.

Step 1020 of the embodiment of the inventive method is invoked after the user clicked on a "What-if Simulation" enabled visualization at step 1010, and step 1020 entails launching the CLM creation tool. FIG. 3 shows a screenshot that enables the user to launch the CLM creation tool that is fabricated in accordance with one or more embodiments of the present invention. To do so, the user clicks on a button entitled "Add" located in the upper right-hand portion of the screenshot (see the caption "Click to launch What-if Simulation model creation tool" in FIG. 3). Control is then transferred to step 1030 of the embodiment of inventive method.

Capacity and/or Load Model Creation Tool

Steps 1030 to 1040 of the embodiment of the inventive method entail running a CLM creation tool that is fabricated in accordance with one or more embodiments of the present invention. In particular, the CLM creation tool obtains input from the user and creates various scenarios of capacity usage (for resources that utilize capacity such as virtual machines ("VMs") as well as capacity intake models (for resources that create capacity such as physical servers).

Figure 4:
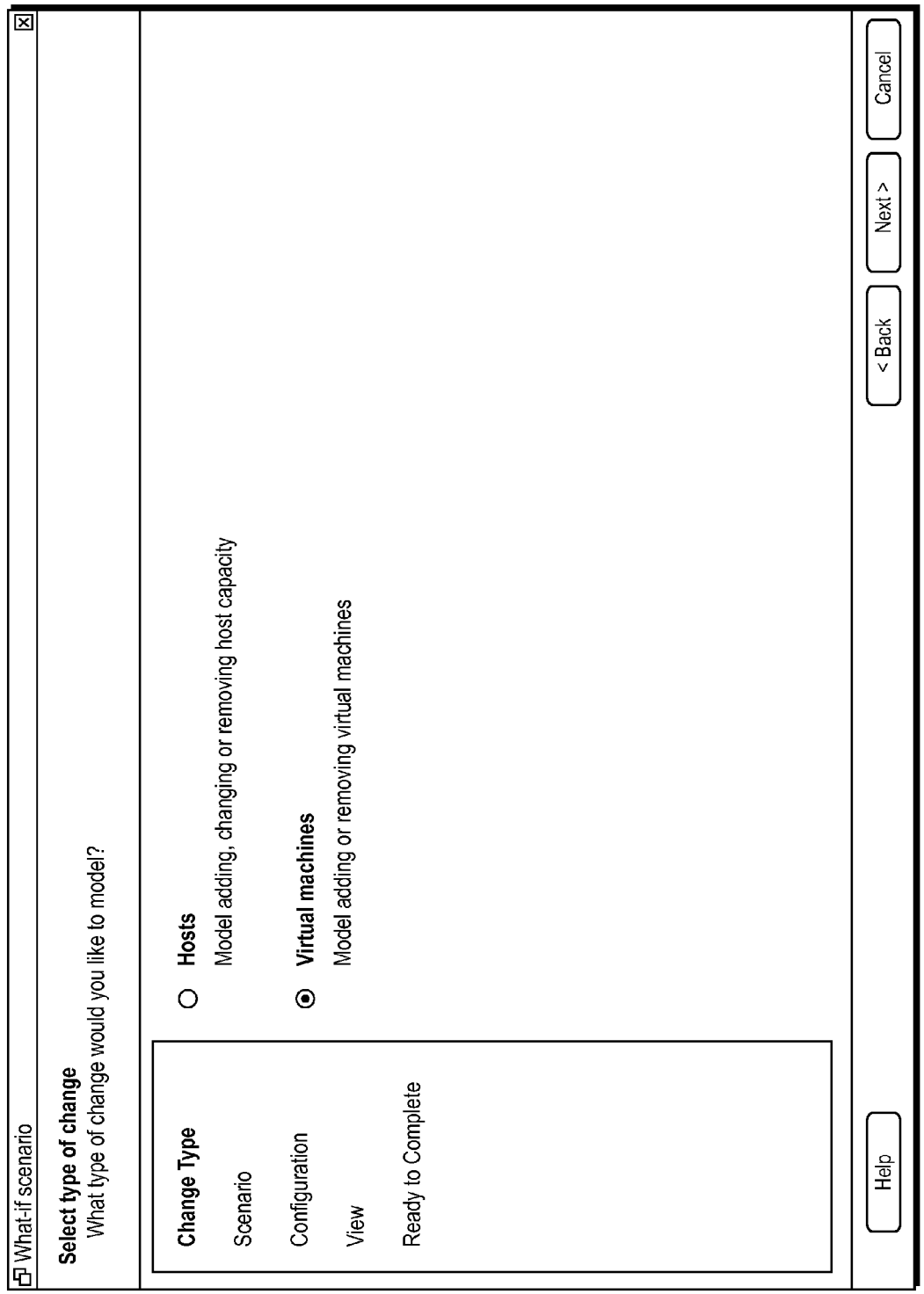
FIG. 4 shows a screenshot that may be used as the first in a series of steps to create a model depicting a custom load (for example and without limitation, of virtual machines ("VMs")) that, when simulated, represents a capacity impact of adding user-specified VMs to a selected capacity container (i.e. a datacenter, a virtual resource pool, a physical server, or a physical cluster of servers).

In particular, step 1030 of the embodiment of the inventive method entails selecting a type of change the user wants to model. At step 1030, the screenshot shown in FIG. 4 is presented to the user. FIG. 4 shows a screenshot that may be used as the first in a series of steps to create a capacity or load model. FIG. 4 provides the user a choice of: (a) creating a custom load model (for example and without limitation, by adding virtual machines ("VMs")) that, when simulated, represents the capacity impact on the capacity container of the load model; or (b) creating a custom capacity model (for example and with limitation, by adding physical servers) that, when simulated, represents the capacity impact on the capacity container of the capacity model. As shown in FIG. 4, the user may select the type of change s/he wants to model (for example and without limitation, the change may entail adding, changing or removing hosts (i.e., servers) or adding or removing VMs). If, as shown in FIG. 4, the user selected the "Virtual Machines" button to model adding or removing VMs to change the load for a capacity container, when the user clicks a "Next" button, control is transferred to step 1040 of the embodiment of inventive method. However, if the user selects the "Hosts" button to model adding, changing or removing hosts (i.e., servers) to change the capacity for a capacity container, when the user clicks the "Next" button, control is transferred to step 1250 of the embodiment of the inventive method.

Load Model—VM Loads

Figure 5:
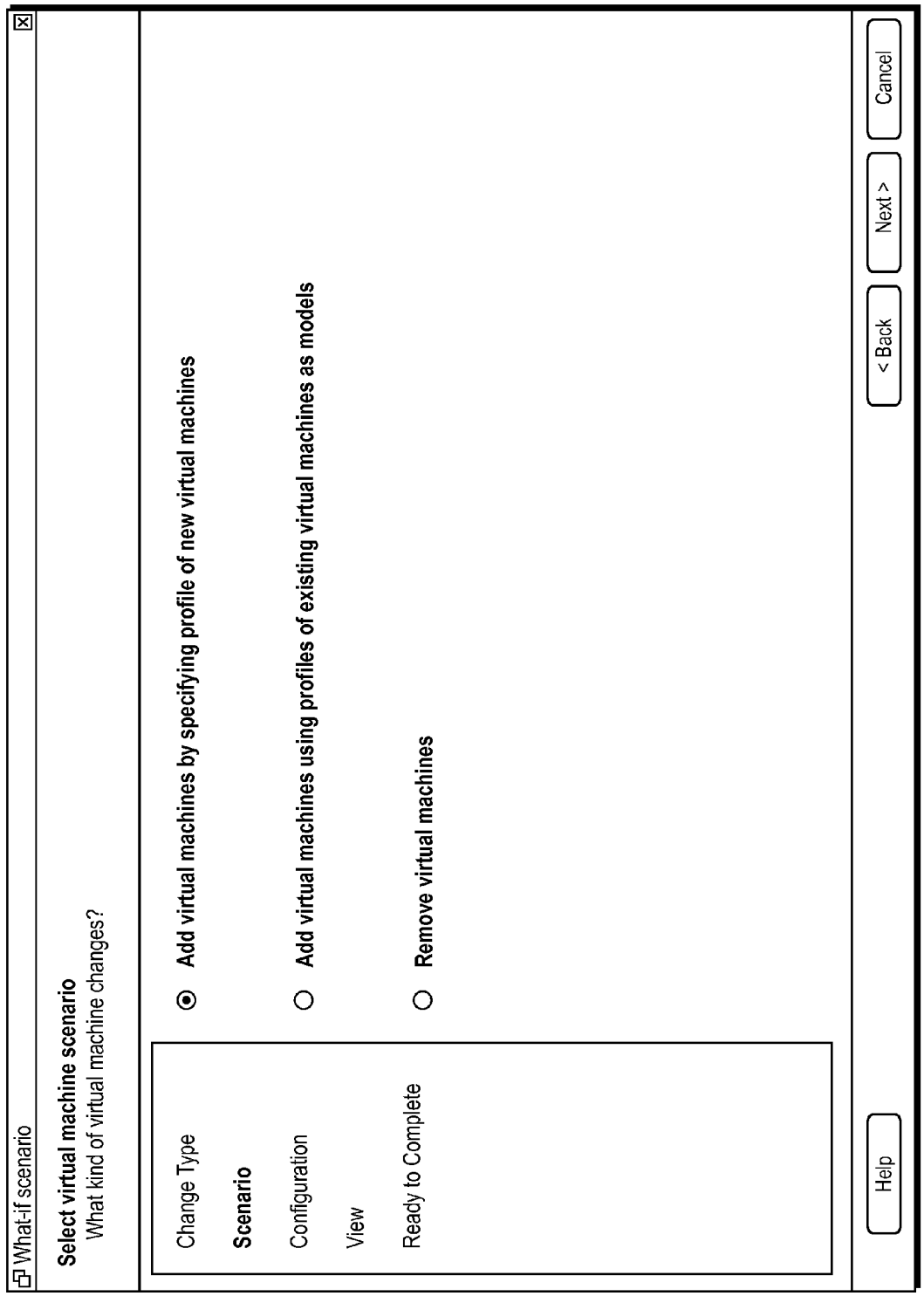
FIG. 5 shows a screenshot that may be used to specify the type of VM changes that are to be modeled.

Step 1040 of the embodiment of the inventive method entails the user selecting the type of load change to be modeled (for example and without limitation, by adding VMs and specifying attributes of the new VMs; by adding VMs using attributes of existing VMs; or by removing VMs). As used herein, a VM attribute is a VM performance parameter or resource configuration such as, for example and without limitation, CPU demand, data storage consumption, network capacity, and so forth. At step 1040, the screenshot shown in FIG. 5 is presented to the user. FIG. 5 shows a screenshot that may be used to specify the type of load (for example and without limitation, VM) changes that are to be modeled. As shown in FIG. 5, the user may select, for example and without limitation, adding VMs by specifying attributes of new VMs; adding VMs using attributes of existing VMs; or removing VMs. As further shown in FIG. 5, the user has selected the "Add virtual machines by specifying profile of new virtual machines" button to indicate s/he wants to model adding VMs to a capacity container by specifying custom created attributes of the new VMs. The user then clicks a "Next" button. If the user selects adding VMs with new attributes, control is transferred to step 1050 of the embodiment of inventive method; if the user selects adding VMs with existing attributes, control is transferred to step 1080; and if the user selects removing VMs, control is transferred to step 1230.

Load Model Using New VM Attributes to Generate a Load

Steps 1050 to 1070 entail running the CLM creation tool and specifying new VM attributes to generate a load model, i.e., the CLM creation tool creates a load model that, when simulated, represents the capacity impact of adding VMs having the new attributes to the designated existing capacity container.

Step 1050 of the embodiment of the inventive method entails the user providing attributes of the additional VMs. At step 1050, the screenshot shown in FIG. 6 is presented to the user. FIG. 6 shows a screenshot that may be used to specify the attributes of additional, custom-configured VMs that are to be added to a capacity container, which attributes include, for example and without limitation: (a) the number of VMs to be added; (b) the number of virtual CPUs (vCPUs) for each of the VMs; (c) the CPU speed in GHz for each of the VMs; (d) the percentage of CPU demand (note that this is referred to as utilization in the figure for sake of ease of user understanding) for each of the VMs; (e) the amount of virtual memory (vMEM) in megabytes (MB) for each of the VMs; and (f) the percentage of memory consumption (note that this is referred to as utilization in the figure for sake of ease of user understanding) for each of the VMs. It should be noted that in accordance with one or more embodiments of the present invention, data for an added VM having user selected attributes may be "normalized" as follows, if necessary, to account for the fact that the added VM may run on a server that has different characteristics (for example, in CPU speed or in the number of cores) from those selected by the user. In particular: (a) configured vCPU speed may be normalized by dividing the selected vCPU speed (for example, in GHz) by the CPU speed of the new server (for example, in GHz); and (b) CPU demand may be normalized in a similar manner. In addition, there may be a "normalization" factor due to, for example and without limitation, changing from a multi-core server to a single core CPU. In particular, a multi-core CPU would be expected to be less efficient than a single core CPU. As such, a normalization factor can be determined, for example and without limitation, by modeling the efficiency of one CPU version vs. another in a manner that is well known to those of ordinary skill in the art. Then, one could model the efficiency as a function of speed using, for example, a geometric series and apply a normalization factor given by 1/(1-efficiency). Lastly, in accordance with one or more such embodiments, the memory consumption data is computed using an overhead that is estimated using the average overhead of VMs in a current population of the selected host or cluster. However, if there are no VMs in the selected host or cluster, the average overhead is taken as an average overhead taken over all VMs in the capacity container. Lastly, if there are no VMs at all in the capacity container, the overhead is taken as being equal to zero. In FIG. 6, a summary of existing resources for the capacity container is shown at the top right-hand corner of the screenshot—in FIG. 6, the summary appears under the heading smcbr-esx.eng.vmware.com. The summary provides the total vCPU and vMEM attributes as well as their "utilizations" (see the note above) averaged over a user-configured time interval. In accordance with one or more embodiments of the present invention, the time interval used to compute the average depends on user settings/preferences.

Figure 29:
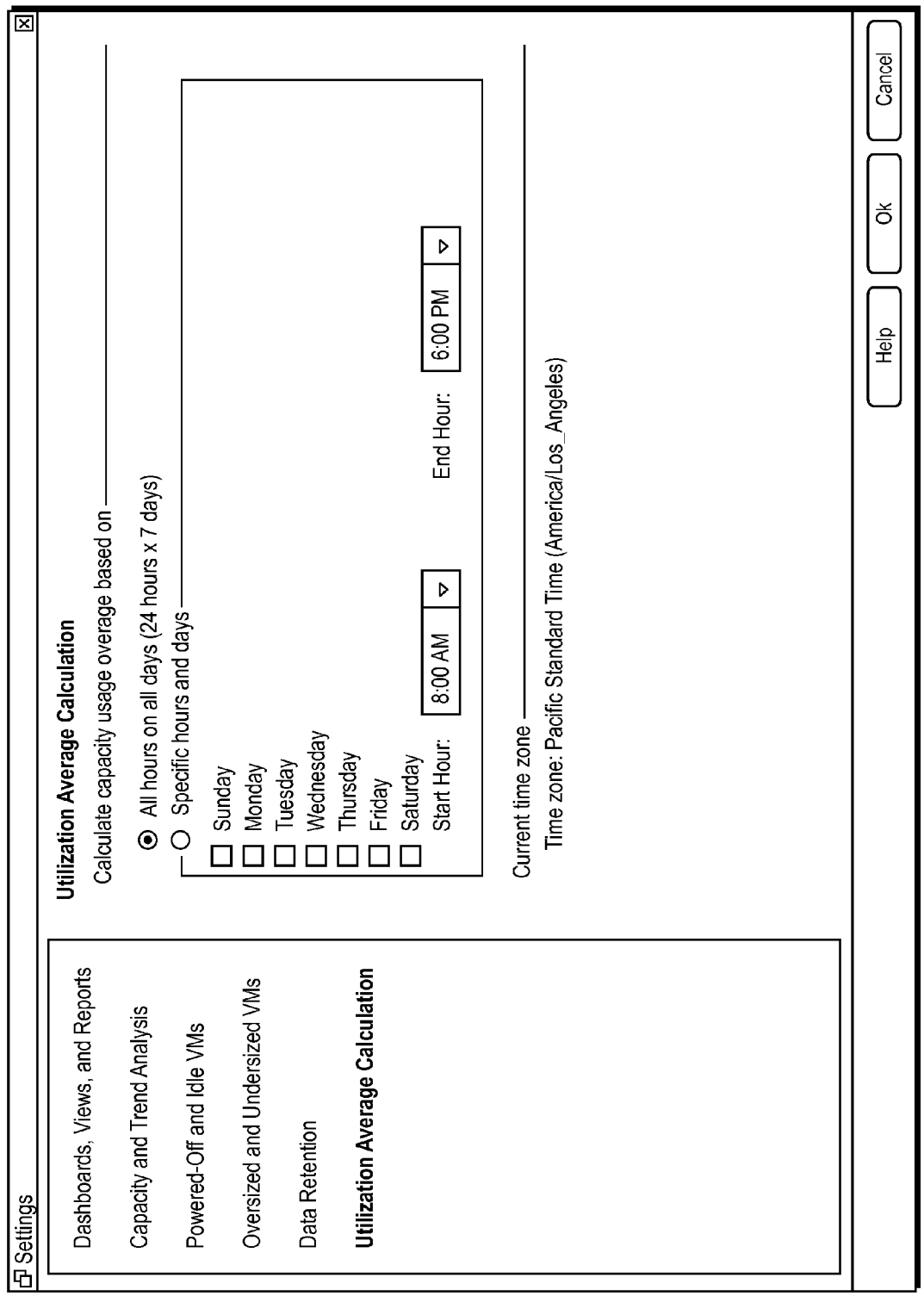
FIG. 29 shows a screenshot that may be used to select a period of time used to compute averages.

FIG. 29 shows a screenshot that may be used to select which measurement data are used to compute averages for a time interval. In particular, as shown in FIG. 29, the user may select to compute an average based on measurements taken during all hours of all days (i.e., "24/7") within a time interval, or the user may select to compute an average based on measurements taken only on specific hours and/or days within a time interval. The capability to select hours and/or days enables a user to ignore data from, for example, maintenance periods which often will not represent typical capacity utilization. In addition, the capability to select hours and/or days enables a user to trend and forecast capacity utilization related to predetermined service level objectives.

As further shown in FIG. 6, the screenshot includes a list of three (3) different VM attribute configurations which are designated Small VM size, Medium VM size and Large VM size, respectively. In accordance with one or more embodiments of the present invention, these VM sizes are determined by sorting the existing VMs in the capacity container by the following attributes, in order: vMemory, followed by vCPU number, followed by vCPU speed. After sorting, the VM in the sorted list at the 33 percentile mark is designated as Small VM size, the VM in the sorted list at the 66 percentile mark is designated as Medium VM size, and the VM in the sorted list at the 99 percentile mark is designated as Large VM size. As further shown in FIG. 6, the screenshot includes the attributes for the Small VM size, the Medium VM size and the Large VM size.

As further shown in FIG. 6, the bottom-right panel of the screenshot includes attributes for the largest and smallest hosts (i.e., physical servers) in the designated capacity container. This information helps the user in creating attributes for custom VMs. For example, this information provides users with some guidelines regarding the physical capacity limitations of a server's population distribution. Although VMs that are larger than the largest available host cannot be run in an efficient manner, the inventive CLSA tool allows simulation of scenarios that cannot be implemented in an existing environment.

Lastly, as further shown in FIG. 6, the center panel of the screenshot is used to provide the custom configuration of the new VM load being added to the capacity container. The user enters the number of custom configured VMs the user would like to include in this load model. Since these are custom created VMs, the database contains no historical "utilization" rates to model; therefore, the user must provide anticipated utilization rates for the specified VM load. The user then clicks a "Next" button, and control is transferred to step 1060 of the embodiment of inventive method.

Figure 7:
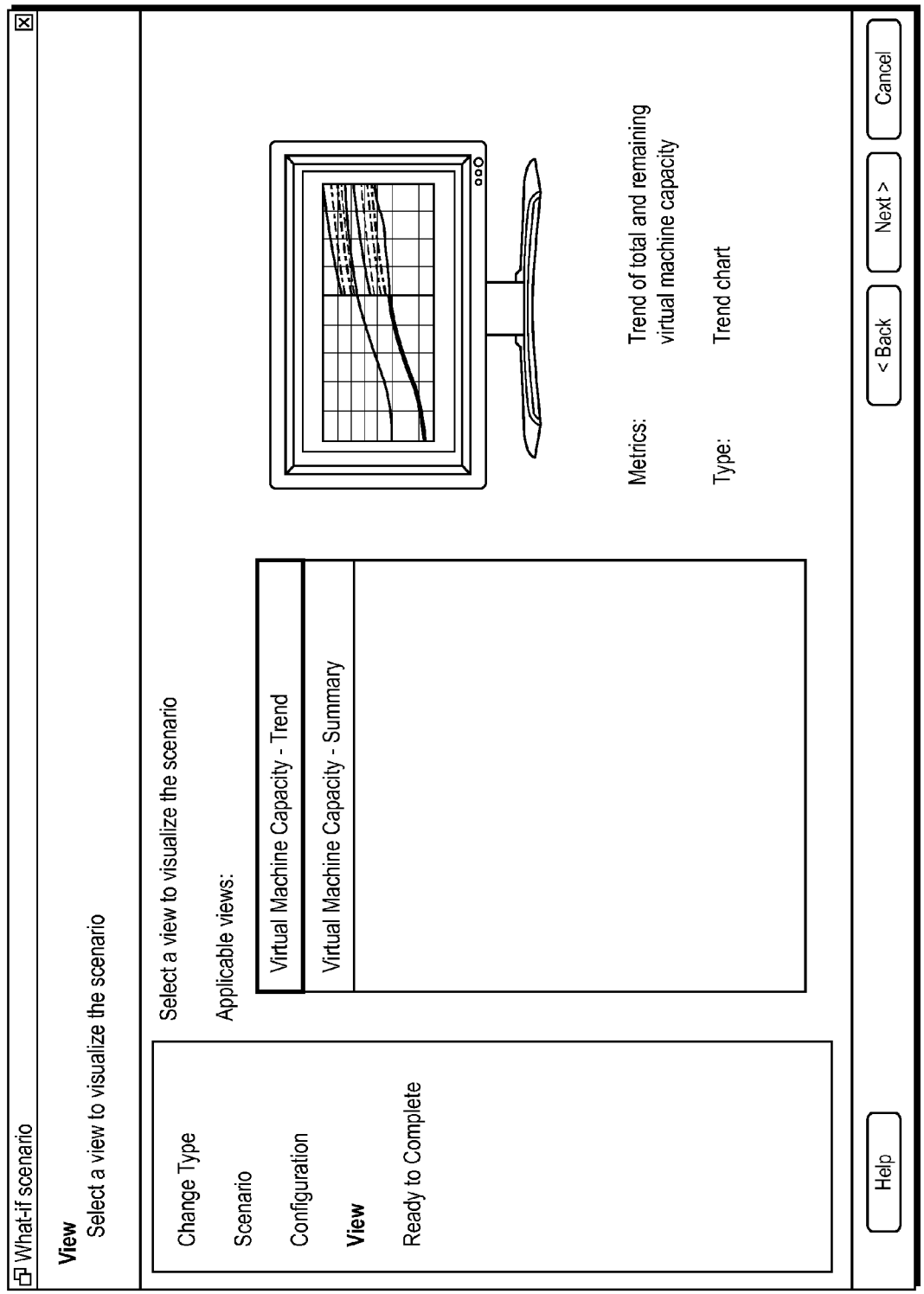
FIG. 7 shows a screenshot that may be used to specify the method used to visualize the impact of the capacity load for the What-if simulation.

Step 1060 of the embodiment of the inventive method entails the user selecting a method used to visualize the impact of the load model just created for the What-if simulation to follow. At step 1060, the screenshot shown in FIG. 7 is presented to the user. FIG. 7 shows a screenshot that may be used to specify the method used to visualize the impact of the load model for the What-if simulation. As shown in FIG. 7, the visualization methods on the screenshot are "Virtual Machine Capacity—Trend" and "Virtual Machine Capacity—Summary." In addition, when the user selects the visualization method, a graphic is displayed which illustrates the visualization method and the metric used therefor. For example, as shown in FIG. 7, the user has selected the Trend visualization where the metric is "Trend of total and remaining virtual machine capacity" and the type of display is a trend chart. Note, step 1060 is not carried out when the CLM creation tool is launched from within a What-if Simulation enabled visualization selected in step 1020 above.

Figure 8:
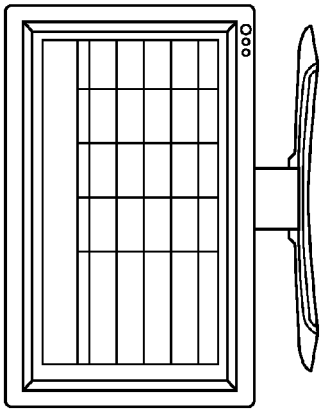
FIG. 8 shows a screenshot that may be used to specify the method used to visualize the impact of the capacity load for the What-if simulation.

FIG. 8 shows a screenshot that may be used to specify the method used to visualize the impact of the load model for the What-if simulation. FIG. 8 is like FIG. 7 except that in FIG. 8, the user has selected the Summary visualization where the metric is "Summary of total and remaining virtual machine and physical capacity" and the type of display is a comparison table. Those of ordinary skill in the art can readily appreciate that although two (2) visualization methods are shown in FIG. 7, further embodiments of the present invention exist where further visualization methods can be used. The user then clicks a "Next" button, and control is transferred to step 1070 of the embodiment of inventive method.

Step 1070 of the embodiment of inventive method entails the user reviewing the load model just created. At step 1070, the screenshot shown in FIG. 9 is presented to the user. FIG. 9 shows a screenshot that presents a summary of the user input for the What-if simulation. The user then clicks a "Finish" button. At this point, the user may utilize the CLSA tool to simulate the model created using the CLM creation tool.

Load Model Using Existing VM Attributes to Generate a Load

Steps 1080 to 1220 entail running the CLM creation tool using existing VM attributes to generate a load model, i.e., the CLM creation tool creates a load model that, when simulated, represents the capacity impact of adding VMs having the attributes of existing VMs to the designated existing capacity container.

Figure 10:
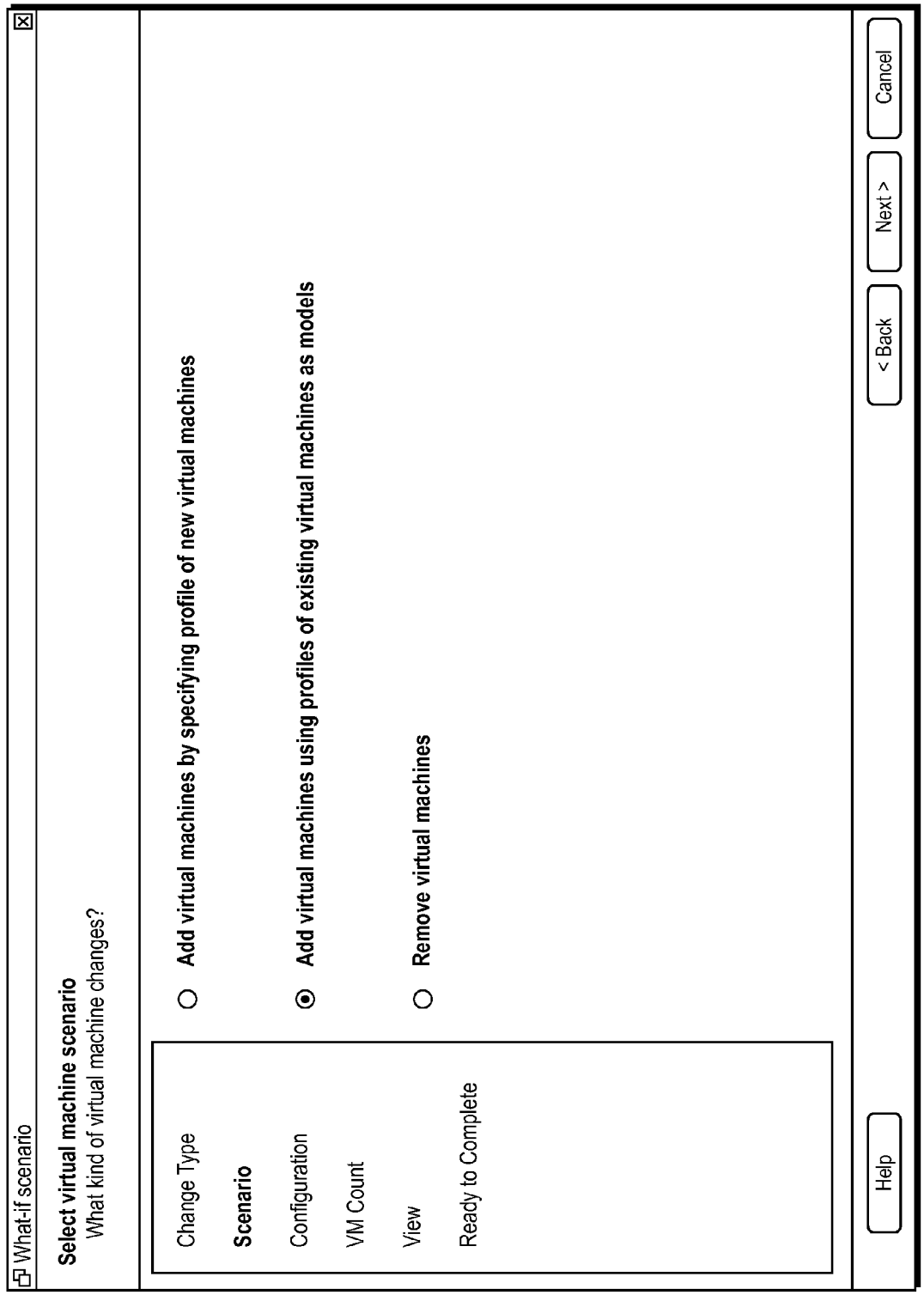
FIG. 10 (the same as the screenshot of FIG. 5 prior to user interaction) shows a screenshot that may be used to specify the type of VM changes that are to be modeled.

In particular, step 1080 is similar to step 1040 above. Step 1080 of the embodiment of inventive method and entails the user selecting the kind of VM changes that are to be modeled. At step 1080, the screenshot shown in FIG. 10 is presented to the user. FIG. 10 (the same as the screenshot of FIG. 5 prior to user interaction) shows a screenshot that may be used to specify the type of VM changes that are to be modeled. As further shown in FIG. 10, the user has selected the "Add virtual machines using profiles of existing virtual machines as models" button to indicate s/he wants to model adding VMs to a capacity container using existing VMs as models for the new VMs. The user then clicks a "Next" button, and control is transferred to step 1090 of the embodiment of inventive method.

Step 1090 of the embodiment of inventive method entails the user adding VMs by selecting attributes of existing VMs as a model for the added VMs. At step 1090, the screenshot shown in FIG. 11 is presented to the user. FIG. 11 shows a screenshot that may be used to select VM attributes for use in adding VMs to a capacity container. As set forth above, step 1090 is reached after the user selected the "Add virtual machines using profiles of existing virtual machines as models" button shown in the screenshot of FIG. 10. Thus, step 1090 entails adding VMs to a capacity container by selecting existing VMs in the datacenter to provide reference attributes (note, the existing VMs do not have to be in the capacity container, they only need to be in a database accessible by the CLM creation tool). In accordance with one or more embodiments of the present invention, the attributes of the selected VMs are imported from the datacenter management system database (for example, database 108 in FIG. 1A). In accordance with one or more such embodiments, the attributes include, for example and without limitation, CPU configuration and speed, memory configuration, CPU demand and Memory consumption, whether a "High Availability" feature is enabled (which "High Availability" feature may be provided by datacenter management system software available from VMware, Inc. of Palo Alto, Calif.), and whether a "Fault Tolerance" feature is enabled (which "Fault Tolerance" feature may be provided by datacenter management system software available from VMware, Inc. of Palo Alto). As one can readily appreciate from the screenshot of FIG. 11, the attributes (including "utilizations" averaged over a user-configured time interval which ends at the time the model is being created) of the selected VMs will be used to create the load model for the ensuing What-if simulation. It should be noted that in accordance with one or more embodiments of the present invention, data for an existing VM may be "normalized" as follows, if necessary, to account for the fact that the existing VM in the model may run on a server that has different characteristics (for example, in CPU speed or in the number of cores) from the server on which the existing VM originally ran and for which data was collected. In particular: (a) configured vCPU speed may be normalized by dividing the existing vCPU speed (for example, in GHz) by the CPU speed of the new server (for example, in GHz); and (b) CPU demand may be normalized in a similar manner. In addition, there may be a "normalization" factor due to, for example and without limitation, changing from a multi-core server to a single core CPU. In particular, a multi-core CPU would be expected to be less efficient than a single core CPU. As such, a normalization factor can be determined, for example and without limitation, by modeling the efficiency of one CPU version vs. another in a manner that is well known to those of ordinary skill in the art. Then, one could model the efficiency as a function of speed using, for example a geometric series and apply a normalization factor given by $1/(1-\text{efficiency})$. Lastly, the memory consumption data for the existing VM uses the same overhead it was given in its original environment, as such, and in accordance with one or more embodiments overhead for memory is simply obtained for the user-selected existing VM data, which VM data is obtained as described above.

As shown in FIG. 11, the bottom-right panel in this screenshot provides an overview of the attributes of the largest and smallest hosts (i.e., physical servers) in the designated capacity container. This information helps the user in creating the attributes for the custom VMs. Although VMs that are bigger than the largest available host cannot be run in an efficient manner, the inventive impact simulation tool allows simulation of scenarios which cannot be implemented in an existing environment.

As shown in FIG. 11, the user has selected two (VMs) (named smcbr-ciq-va and smcbr-desktop, respectively), each having one (1) vCPU with a speed of 2.4 GHz and 2048 MB of memory, and the VMs have CPU demand (note that this is referred to as utilization in the figure for sake of ease of user understanding) of 5% and 11%, respectively, and memory consumption (note that this is referred to as utilization in the figure for sake of ease of user understanding) of 19% and 27%, respectively. The user then clicks a "Next" button, and control is transferred to step 1200 of the embodiment of inventive method.

Step 1200 of the embodiment of inventive method entails the user specifying a multiplier associated with the VM attributes selected in step 1090. At step 1200, the screenshot shown in FIG. 12 is presented to the user. FIG. 12 shows a screenshot that may be used to specify multipliers associated with the custom VMs. As shown in FIG. 12, the user has specified one (1) of a first VM and twenty-one (21) of a second VM. The user then clicks a "Next" button, and control is transferred to step 1210 of the embodiment of inventive method.

Step 1210 is the same as step 1060 described above and entails the user selecting a method used to visualize the impact of the load model just created in the What-if simulation to follow. At step 1210, a screenshot like that shown in FIG. 7 is presented to the user, which screenshot may be used to specify the method used to visualize the impact of the load model for the What-if simulation. As shown and described above with respect to FIG. 7, the visualization methods on the screenshot are "Virtual Machine Capacity—Trend" and "Virtual Machine Capacity—Summary." In addition, when the user selects the visualization method, a graphic is displayed which illustrates the visualization method and the metric used therefor. The user then clicks a "Next" button, and control is transferred to step 1220 of the embodiment of inventive method.

Step 1220 of the embodiment of inventive method entails the user reviewing the load model just created. At step 1220, the screenshot shown in FIG. 13 is presented to the user. FIG. 13 shows a screenshot that presents a summary of the user input for the What-if simulation. The user then clicks a "Finish" button. At this point, the user may utilize the CLSA tool to simulate the model created using the CLM creation tool.

Load Model by Removing Existing VMs

Steps 1230 to 1240 entail running the CLM creation tool to generate a load model depicting the removal of existing load (for example and without limitation, VMs), i.e., the CLM creation tool creates a load model that, when simulated, represents the capacity impact of removing selected VMs from the designated existing capacity container.

Step 1230 of the embodiment of inventive method entails the user selecting a set of VM attributes to be removed from an existing inventory in a capacity container. At step 1230, the screenshot shown in FIG. 14 is presented to the user. FIG. 14 shows a screenshot that may be used to select VMs to be removed from a capacity container. As shown in FIG. 14, the user selected VMs smcbr-ciq-demo and smcbr-ciq-va to be removed. The user then clicks a "Next" button, and control is transferred to step 1235 of the embodiment of inventive method.

Step 1235 of the embodiment of the inventive method is the same as step 1060 described above and entails the user selecting a method used to visualize the impact of the load model for the What-if scenario just created. At step 1235, a screenshot like that shown in FIG. 7 is presented to the user, which screenshot may be used to specify the method used to visualize the impact of the load model for the What-if simulation. As shown and described above with respect to FIG. 7, the visualization methods in the screenshot are "Virtual Machine Capacity—Trend" and "Virtual Machine Capacity—Summary." In addition, when the user selects the visualization method, a graphic is displayed which illustrates the visualization method and the metric used therefor. The user then clicks a "Next" button, and control is transferred to step 1240 of the embodiment of inventive method.

Figure 15:
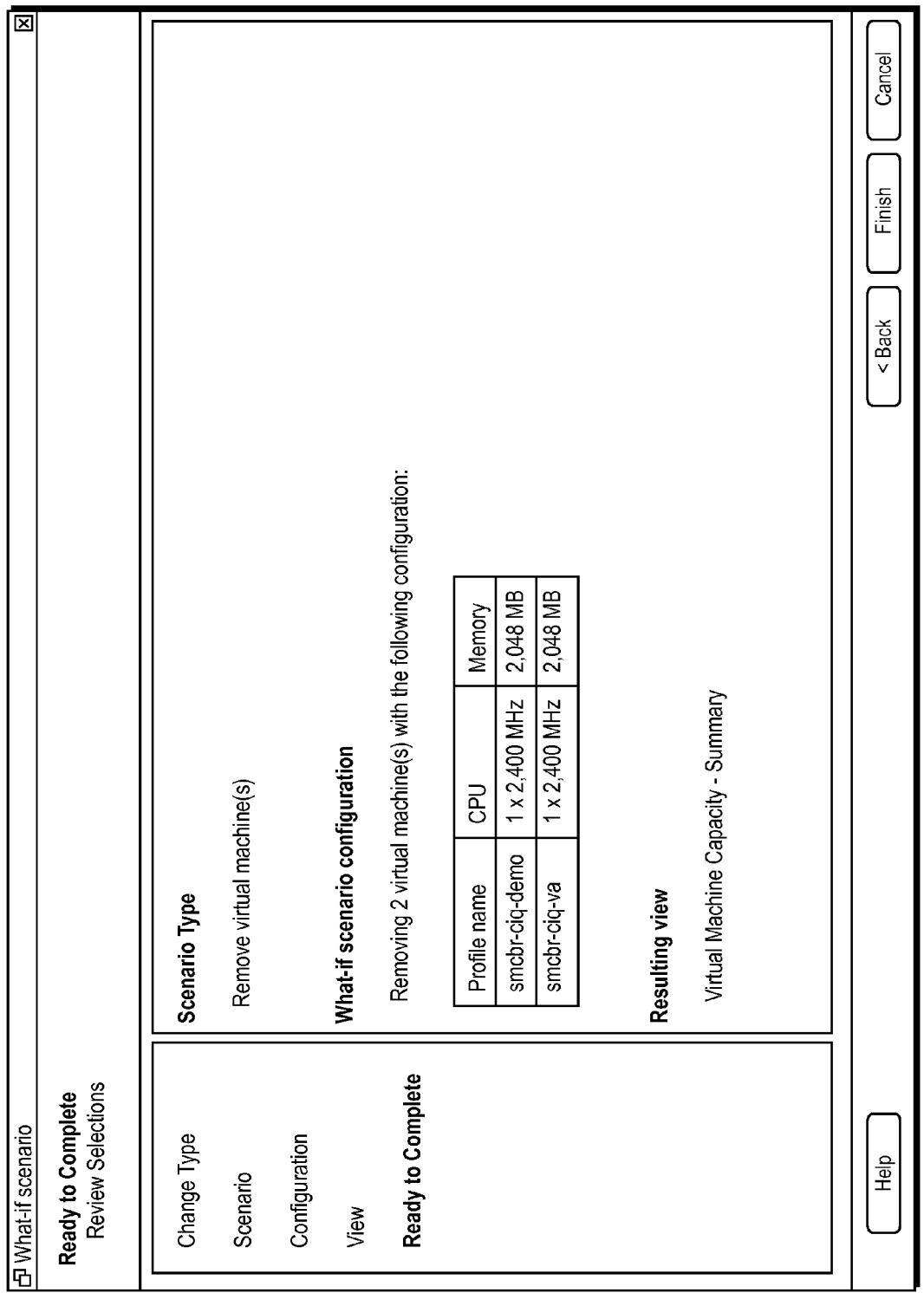
FIG. 15 shows a screenshot that presents a summary of the user input for the What-if scenario configuration.

Step 1240 of the embodiment of inventive method entails the user reviewing the load model just created. At step 1240, the screenshot shown in FIG. 15 is presented to the user. FIG. 15 shows a screenshot that presents a summary of the user input for the What-if simulation. The user then clicks a "Finish" button. At this point, the user may utilize the CLSA tool to simulate the model created using the CLM creation tool.

Capacity Model—Host Capacity

Step 1250 of the embodiment of inventive method entails the user selecting the type of capacity change to be modeled (for example and without limitation, by adding hosts and specifying attributes of the new hosts; by adding hosts using attributes of existing hosts; or removing hosts). As used herein, a host attribute is a host performance parameter or resource configuration such as, for example and without limitation, CPU utilization, data storage utilization, network capacity, and so forth. At step 1250, the screenshot shown in FIG. 16 is presented to the user. FIG. 16 shows a screenshot that may be used to specify the type of capacity (for example and without limitation, host) changes that are to be modeled. As shown in FIG. 16, the user may select, for example and without limitation, adding hosts to a selected cluster; changing cluster or host capacity configuration; or removing hosts from a selected cluster. As further shown in FIG. 16, the user has selected the "Add hosts to the selected cluster" button to indicate s/he wants to model adding hosts to a capacity container, in this case, a cluster of servers. The user then clicks a "Next" button. If the user selects "Add hosts to the selected cluster," control is transferred to step 1260 of the embodiment of inventive method; if the user selects "Change cluster or host capacity configuration," control is transferred to step 1290; and if the user selects "Remove hosts from selected cluster," control is transferred to step 1320.

Capacity Model by Adding Hosts

Steps 1260 to 1280 entail running the CLM creation tool to add new servers to generate a capacity model, i.e., the CLM creation tool creates a capacity model that, when simulated, represents the capacity impact of adding servers to the designated existing capacity container.

Step 1260 of the embodiment of inventive method entails the user providing attributes (for example, resource configurations) of additional servers. At step 1260, the screenshot shown in FIG. 17 is presented to the user. FIG. 17 shows a screenshot that may be used to specify the attributes of additional, custom-configured servers that are to be added to a capacity container. In FIG. 17, a global summary of resources for a particular capacity container is shown at the top right-hand corner of the screenshot—in FIG. 17, the global summary appears under the heading M3cluster-0. The global summary provides the total CPU and memory configuration as well as their CPU demand (note that this is referred to as usage in the figure for sake of ease of user understanding) and memory consumption (note that this is referred to as usage in the figure for sake of ease of user understanding) averaged over a user-configured time interval which ends at the time the model is being created. In accordance with one or more embodiments of the present invention, time interval used to compute the average depends on user settings/preferences.

Following the global summary is a list of all available physical servers running a virtualization hypervisor, along with their configured resources, their current "usage" rates (see the note above), and the number of VMs (or pieces of load/workload) running on a particular server. As shown in FIG. 17, the right-hand panel of the screenshot shows the following attributes for each server in a cluster: the number of cores, the speed of the cores in GHz, the amount of memory in GB, the percentage of CPU "usage" (see the note above), the percentage of memory "usage" (see the note above), and the number of VMs.

As further shown in FIG. 17, the bottom-right panel of the screenshot shows an overview of the largest and smallest VMs (or virtualized pieces of workload) in a particular capacity container (typically a cluster or resource pool). This information helps the user in creating the configuration of the servers.

Lastly, as further shown in FIG. 17, the center panel of the screenshot is used to provide custom configuration of the new physical server capacity being added to the capacity container. The user also enters the number of these custom configured servers to include in the capacity model. The user then clicks a "Next" button, and control is transferred to step 1270 of the embodiment of inventive method.

Step 1270 of the embodiment of the inventive method is the same as step 1060 described above and entails the user selecting a method used to visualize the impact of the capacity model for the What-if scenario just created. At step 1270, a screenshot like that shown in FIG. 7 is presented to the user, which screenshot may be used to specify the method used to visualize the impact of the capacity model for the What-if simulation. As shown and described above with respect to FIG. 7, the visualization methods on the screenshot are "Virtual Machine Capacity—Trend" and "Virtual Machine Capacity—Summary." In addition, when the user selects the visualization method, a graphic is displayed which illustrates the visualization method and the metric used therefor. The user then clicks a "Next" button, and control is transferred to step 1280 of the embodiment of inventive method.

Figure 18:
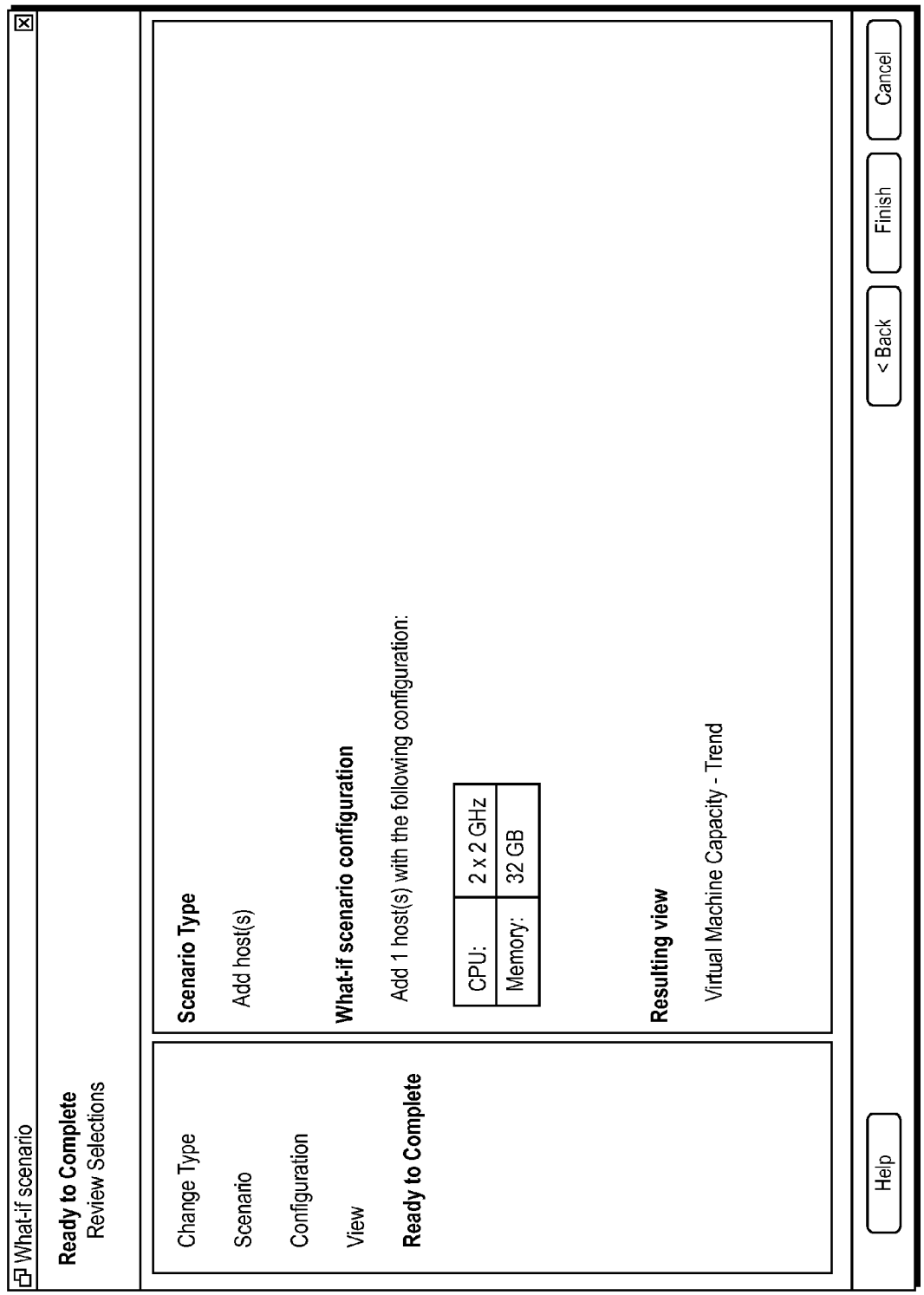
FIG. 18 shows a screenshot that presents a summary of the user input for the What-if scenario configuration.

Step 1280 of the embodiment of inventive method entails the user reviewing the capacity model just created. At step 1280, the screenshot shown in FIG. 18 is presented to the user. FIG. 18 shows a screenshot that presents a summary of the user input for the What-if simulation. The user then clicks a "Finish" button. At this point, the user may utilize the CLSA tool to simulate the model created using the CLM creation tool.

Capacity Model by Changing Cluster or Host Attributes

Steps 1290 to 1310 entail running the CLM creation tool to replace all existing hosts in a capacity container with new hosts, i.e., the CLM creation tool creates a capacity model that, when simulated, represents the capacity impact of replacing all physical hosts in the designated capacity container.

Step 1290 of the embodiment of inventive method entails the user providing configuration details of the replacement, custom-configured physical servers that are to replace existing hosts in the capacity container. At step 1290, the screenshot of FIG. 19 is presented to the user. FIG. 19 shows a screenshot that may be used to specify the new configuration for a cluster using reference statistics as a guide. In FIG. 19, a global summary of resources for a particular capacity container is shown at the top right-hand corner of the screenshot—in FIG. 19, the global summary appears under the heading M3cluster-0. The global summary provides the total CPU and memory configuration as well as their CPU demand (note that this is referred to as usage in the figure for sake of ease of user understanding) and memory consumption (note that this is referred to as usage in the figure for sake of ease of user understanding) averaged over a user-configured time interval which ends at the time the model is being created. In accordance with one or more embodiments of the present invention, the time interval used to compute the average depends on user settings/preferences.

Following the global summary is a list of all available physical servers running a virtualization hypervisor along with their configured resources, their current "usage" rates (see the note above), and the number of VMs (or pieces of load/workload) running on a particular server. As shown in FIG. 19, the right-hand panel of the screenshot shows the following attributes for each server in a cluster: the number of cores, the speed of the cores in GHz, the amount of memory in GB, the percentage of CPU "usage" (see the note above), the percentage of memory "usage" (see the note above), and the number of VMs.

As further shown in FIG. 19, the bottom-right panel of the screenshot shows an overview of the largest and smallest VMs (or virtualized pieces of workload) in a particular capacity container (typically a cluster or resource pool).

Lastly, as further shown in FIG. 19, the center panel of the screenshot is used to provide a custom configuration of the new physical server capacity being used as a replacement in the capacity container. The user also enters the number of these custom configured servers to include in the capacity model. The user then clicks a "Next" button, and control is transferred to step 1300 of the embodiment of inventive method.

Step 1300 of the embodiment of the inventive method is the same as step 1060 described above and entails the user selecting a method used to visualize the impact of the capacity model for the What-if scenario just created. At step 1300, a screenshot like that shown in FIG. 7 is presented to the user which screenshot may be used to specify the method used to visualize the impact of the capacity model for the What-if simulation. As shown and described above with respect to FIG. 7, the visualization methods in the screenshot are "Virtual Machine Capacity—Trend" and "Virtual Machine Capacity—Summary." In addition, when the user selects the visualization method, a graphic is displayed which illustrates the visualization method and the metric used therefor. The user then clicks a "Next" button, and control is transferred to step 1310 of the embodiment of inventive method.

Figure 20:
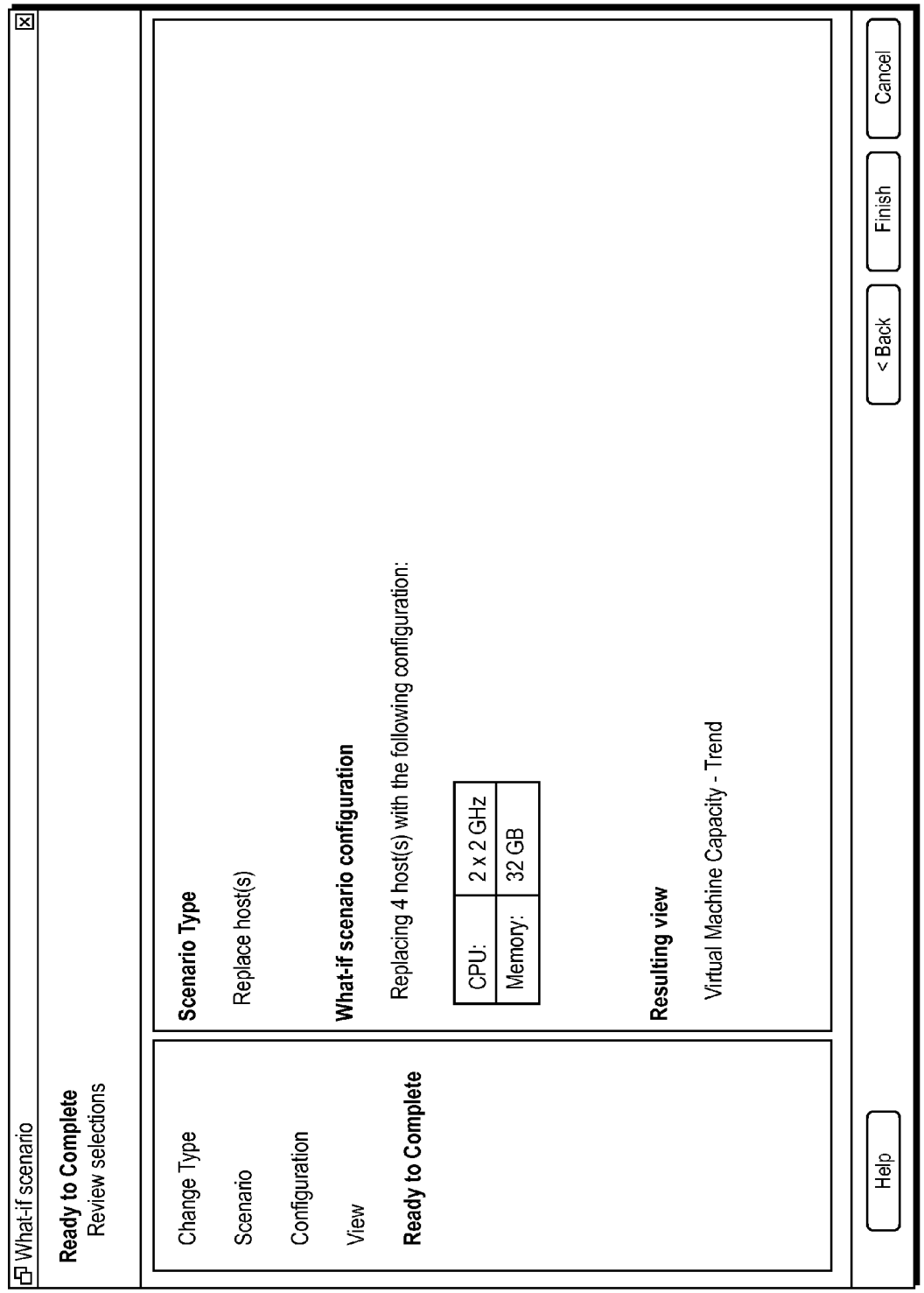
FIG. 20 shows a screenshot that presents a summary of the user input for the What-if scenario configuration.

Step 1310 of the embodiment of inventive method entails the user reviewing the capacity model just created. At step 1310, the screenshot shown in FIG. 20 is presented to the user. FIG. 20 shows a screenshot that presents a summary of the user input for the What-if simulation. The user then clicks a "Finish" button. At this point the user may utilize the CLSA tool to simulate the model created using the CLM creation tool.

Capacity Model by Removing Existing Hosts

Steps 1320 to 1340 entail running the CLM creation tool to generate a capacity model depicting the removal of existing capacity (for example and without limitation, physical servers), i.e., the CLM creation tool creates a capacity model that, when simulated, represents the capacity impact of removing selected physical servers from the designated capacity container.

Step 1320 of the embodiment of inventive method entails the user selecting physical servers to be removed from a capacity container. At step 1320, the screenshot shown in FIG. 21 is presented to the user. FIG. 21 shows a screenshot that may be used to select physical servers to be removed from a capacity container. In FIG. 21, the servers in a cluster are identified along with the number and speed of their CPUs and the amount of their memory. As shown in FIG. 21, the user has selected servers M3host-1 and M3host3. The user then clicks a "Next" button, and control is transferred to step 1330 of the embodiment of inventive method.

Step 1330 of the embodiment of the inventive method is the same as step 1060 described above and entails the user selecting a method used to visualize the impact of the capacity model for the What-if scenario just created. At step 1330, a screenshot like that shown in FIG. 7 is presented to the user, which screenshot may be used to specify the method used to visualize the impact of the capacity model for the What-if simulation. As shown and described above with respect to FIG. 7, the visualization methods in the screenshot are "Virtual Machine Capacity—Trend" and "Virtual Machine Capacity—Summary." In addition, when the user selects the visualization method, a graphic is displayed which illustrates the visualization method and the metric used therefor. The user then clicks a "Next" button, and control is transferred to step 1340 of the embodiment of inventive method.

Figure 22:
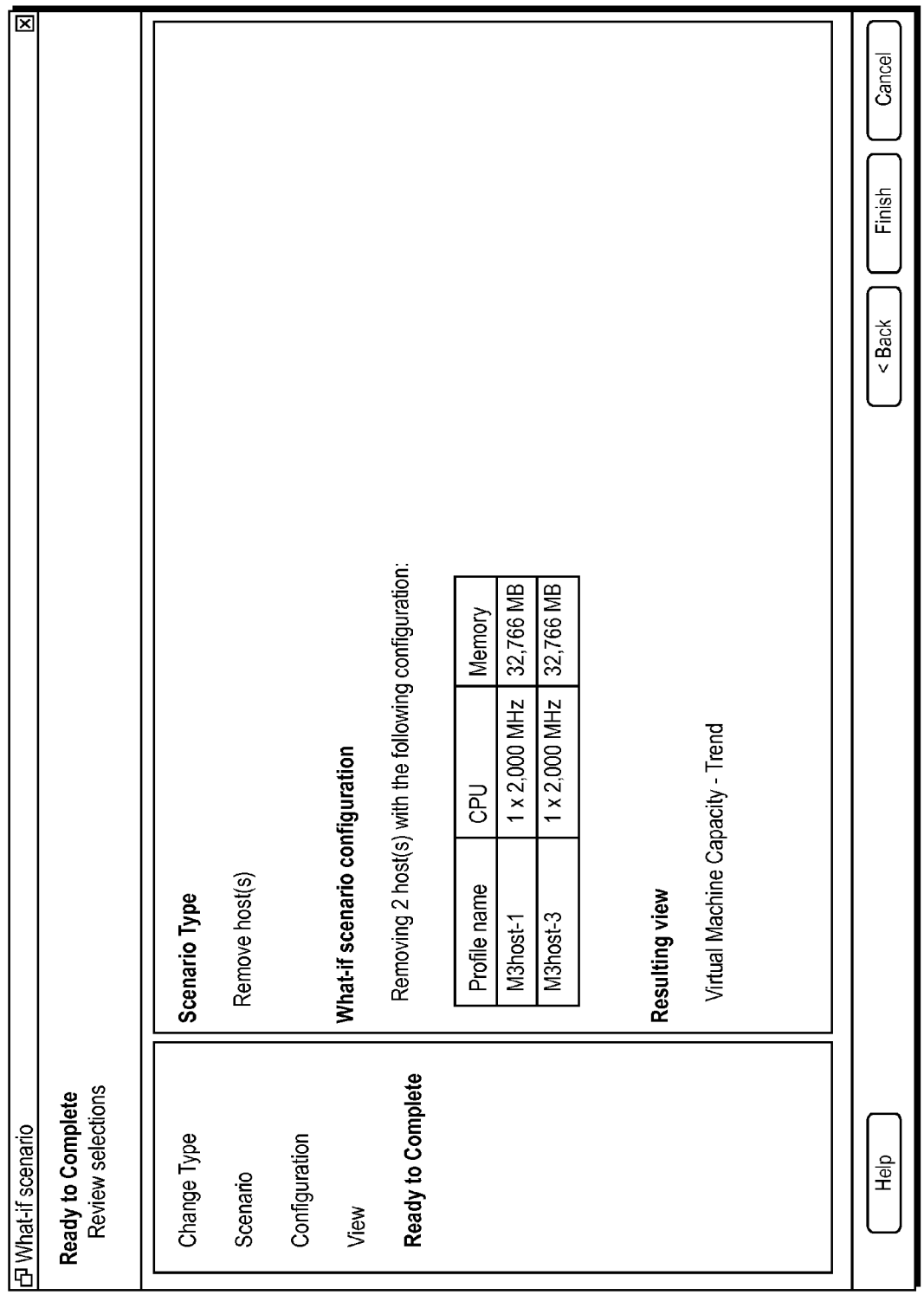
FIG. 22 shows a screenshot that presents a summary of the user input for the What-if scenario configuration.

Step 1340 of the embodiment of inventive method entails the user reviewing the capacity model just created. At step 1340, the screenshot shown in FIG. 22 is presented to the user. FIG. 22 shows a screenshot that presents a summary of the user input for the What-if simulation. The user then clicks a "Finish" button. At this point, the user may utilize the CLSA tool to simulate the model created using the CLM creation tool.

Further embodiments of the present invention exist wherein a user may specify attributes for VMs and/or servers to be added to a capacity container on a detailed basis such as, for example and without limitation, where an added virtual machine is specified to comprise CPU cores of varying size, speed and demand and where an added server is specified to comprise CPU cores of varying size and speed. Further, it should be clear to one of ordinary skill in the art how such further embodiments may be fabricated in light of the detailed description above.

Capacity and Load Simulation and Analysis

A user would like to respond to changing market and business requirements by simulating real-world use cases, for example and without limitation, use cases related to whether a company is acquiring or consolidating businesses, adding new headcount, or deploying multi-tiered applications. The CLSA tool enables the user to model various scenarios to understand and quantify the business impact. Understanding the business impact enables the user to can make informed purchasing, provisioning and planning decisions.

As will become apparent from the description below, the CLSA tool provides visibility into future infrastructure capacity and when capacity will run out. For example and without limitation, in particular, the CLSA tool enables a user to answer the following questions: (a) how many more VMs can one add to a capacity container?; (b) what happens to capacity if one adds more VMs to a capacity container?; (c) when will a capacity container run out of capacity?; and (d) what happens to capacity if one adds more hosts to a capacity container? In particular, as will be described in detail below, the CLSA tool, based on historical capacity consumption patterns, can trend and, based on the models created as described above, forecast future capacity needs to help ensure that capacity is available to meet a particular service level agreement. In order to carry out one or more of the actions described in detail below, the CLSA tool will collect server and VM configurations and CPU demand and memory consumption data for a capacity container, which configurations and data may be available as data, or may be computed from data available, by accessing database 108 or by requesting such information from DMS 110 in accordance with any one of a number of methods that are well known to those of ordinary skill in the art.

In accordance with one or more embodiments of the present invention, the "Virtual Machine Capacity—Trend" visualization of simulation results shows the impact of the capacity and/or load model resulting from the What-if simulation. In accordance with one or more such embodiments, the original state of the capacity container is shown in solid lines, while the results of the What-if simulation are shown in dotted lines. In addition, and in accordance with one or more embodiments of the present invention, the CLSA tool enables the user to combine What-if simulations that include multiple capacity or load models enable the user to compare or combine the impact of simulating multiple models. To combine the results of simulating two models, the user selects the "Combine Scenarios" radio button on the results screenshot to update the visualization.

The following discusses concepts useful in understanding the inventive CLSA tool. In simulations and their associated visualizations, a "Virtual Machine" is used as a unit of measurement, which unit of measurement is referred to as a "VM" unit. In accordance with one or more embodiments of the present invention, units of measurements are averaged and are expressed in "average" units to smooth short-term data (for example, capacity related) fluctuations. Thus, in accordance with one or more embodiments of the present invention, an Average Virtual Machine unit (referred to as an "AVM" unit) is used to specify a VM unit. In accordance with one or more such embodiments, an AVM unit is a construct representing the following parameters:

AVM unit={configured CPU cores, configured CPU demand capacity, CPU demand (averaged over a time interval), configured Memory, Memory consumption (averaged over the time interval)} where the time interval used to compute averages is user configurable. In accordance with one or more embodiments of the present invention, for an AVM unit, (a) the value of configured CPU cores is determined by (i) summing the number of vCPU cores for each VM in the capacity container (this provides the configured CPU cores for each VM), (ii) summing the configured CPU cores for each VM over all the VMs in the capacity container, and then (iii) dividing by the number of VMs in the capacity container; (b) the value of configured CPU demand capacity is determined by (i) summing the configured CPU demand capacity of each vCPU core for each VM in the capacity container (this provides the configured CPU demand capacity for each VM where the configured CPU demand capacity for each VM equals the number of cycles available for use by the VM, and therefore, the configured CPU demand capacity is equal to the CPU speed in, for example and without limitation, MHz), (ii) summing the configured CPU demand capacity for each VM over all the VMs in the capacity container, and then (iii) dividing by the number of VMs in the capacity container; (c) the value of configured Memory is determined by (i) summing the amount of vMemory for each VM in the capacity container (this provides the configured Memory for each VM), (ii) summing the configured Memory for each VM over all the VMs in the capacity container, and then (iii) dividing by the number of VMs in the capacity container; (d) the value of CPU demand (averaged over a time interval) is determined by (i) summing the average of the CPU demand for each VM in the capacity container (the average of the CPU demand for a VM is the sum of the averages of vCPU demand in the VM, however, the measurement data used to compute the average CPU demand for a VM are typically captured by datacenter management software 110 as the sum of demand over each vCPU in the VM, i.e., the data is typically not captured on a per vCPU basis) (xx) where the vCPU demand for each VM is equal to the time during which the physical CPU is executing instructions for the vCPU plus the amount of time the vCPU is in a "ready" state (i.e., a state where the vCPU has work to do but has to wait for access to a physical CPU)—the demand may be reported in units of time or in units of the number of CPU clock "ticks" used in executing instructions measured, for example and without limitation, in MHz or GHz and (yy) where the time interval over which the average is computed is determined by a user setting/preference, and then (ii) dividing by the number of VMs in the capacity container; and (e) the value of "Memory consumption (averaged over a time interval)" is determined by (i) summing the average of the Memory consumption for each VM in the capacity container (the average of the Memory consumption for a VM is the sum of the averages of vMemory consumption in the VM where consumption is equal to the amount of utilization of guest physical memory in a VM minus the amount of memory used by the virtualization software for "memory ballooning" and "memory sharing" (as is known to those of ordinary skill in the art, these refer to methods of memory management provided by software available from VMware, Inc. of Palo Alto, Calif.) plus the amount of memory used as overhead by the virtualization software, however, the measurement data used to compute the average Memory consumption for a VM are typically captured by datacenter management software 110 as the sum of consumption over each vMemory in the VM, i.e., the data is typically not captured on a per vMemory basis) where the time interval over which the average is computed is determined by the user setting/preference, and then (ii) dividing by the number of VMs in the capacity container. In accordance with one or more embodiments of the present invention, data from which CPU demand and memory consumption can be computed is collected on a VM basis at measurement intervals, meaning that: (a) the CPU demand at a particular point in time for a VM represents a sum of demand of each vCPU in the VM; and (b) the Memory consumption at a particular point in time for a VM represents a sum of all Memory consumption in the VM.

In accordance with one or more embodiments of the present invention, a time averaged quantity in an AVM unit equals the sum of measured quantities over time interval ti divided by the number of measurement time intervals (mti) in time interval ti; where a time interval can be any unit of time such as, for example and without limitation, hours, days, months, quarters or years. To better understand this, consider the following example. Assume:

1. Quantity (q)=CPU demand measured in MHz where a measurement is made every hour.
2. Time interval of measurement collection ti=1 week
3. Measurement time interval (mti)=1 hour
Therefore:
1. Total measured quantities (tq)=Sum of measured quantities ($\Sigma q_1$) over ti
2. Total no. of measurement time intervals in time interval ti (Nmti)=24 hrs*7 days=168
3. Average Quantity=tq/Nmti or tq/168

Since capacity planning in accordance with one or more embodiments of the present invention relies on averages of data instead of raw metrics, the following example shows how data is collected in accordance with one or more such embodiments of the present invention.

Assume CPU demand data for a VM is collected at a measurement interval of five minutes (i.e., a measurement is taken every five (5) minutes) for a time interval of one (1) day (note that an hourly time interval is typically the smallest relevant time interval for long term capacity planning) Table 1 represents compressed data at an hourly granularity. Note also that in accordance with one or more such embodiments, the data is stored for each hour as the sum of previous measurements. The CPU demand represented here is the current CPU demand of a particular VM/Host at a particular time instance.

TABLE 1

| ID | CPU demand (MHz) | Time Stamp |
|----|------------------|------------|
| 1  | 234              | Xxx        |
| 2  | 234 + 334 = 568  | Yyy        |
| 3  | 568 + 667 = 1235 | Zzz        |
| ...|                  |            |
| ...|                  |            |
| 24 | XYZ              | Aaa        |

The benefits of this form of data compression are two-fold. First, the compression disclosed in conjunction with Table 1 has reduced 288 records of raw measurement data (corresponding to one measurement every 5 minutes for 24 hours) to 24 records. Second, since capacity planning in accordance with one or more embodiments of the present invention uses averages of metrics, the data is available in a pre-computed average format for an hourly interval. Similarly, in accordance with one or more such embodiments, data may be stored in secondary tables that persist the averages in daily, weekly, monthly, quarterly and yearly pre-computed tables.

Simulation and Visualization in Units of AVMs

In accordance with one or more embodiments of the present invention, the CLSA tool creates a trend that describes capacity utilization in a capacity container that has taken place in the past through the present (a trend might show that capacity utilization is increasing, decreasing, or remaining the same). To do this, in accordance with one or more embodiments of the present invention, the CLSA tool fits historical data into a trend to visualize capacity utilization patterns over time, for example, into the future. In accordance with one or more such embodiments, the CLSA tool obtains the trend by fitting historical data (i.e., data for a selected capacity container from the past up to the present) into a trend curve using a curve-fitting method. In accordance with one or more embodiments of the present invention, the present may be considered a time at which the CLSA tool is executing or a predetermined time before that. In accordance with one or more such embodiments, the particular choice of a curve-fitting method is user-selected (i.e., it depends on user settings/preferences). The user may select any one of a number of regression analysis techniques that are well known to those of ordinary skill in the art such as, for example and without limitation, linear regression analysis, polynomial regression analysis, exponential regression analysis, logarithmic regression analysis, or power regression analysis. In addition, the user may select the time interval and the number of time intervals over which the trend is calculated where a time interval may be, for example and without limitation, a day, a week, a month or a quarter, i.e., three months.

Figure 28:
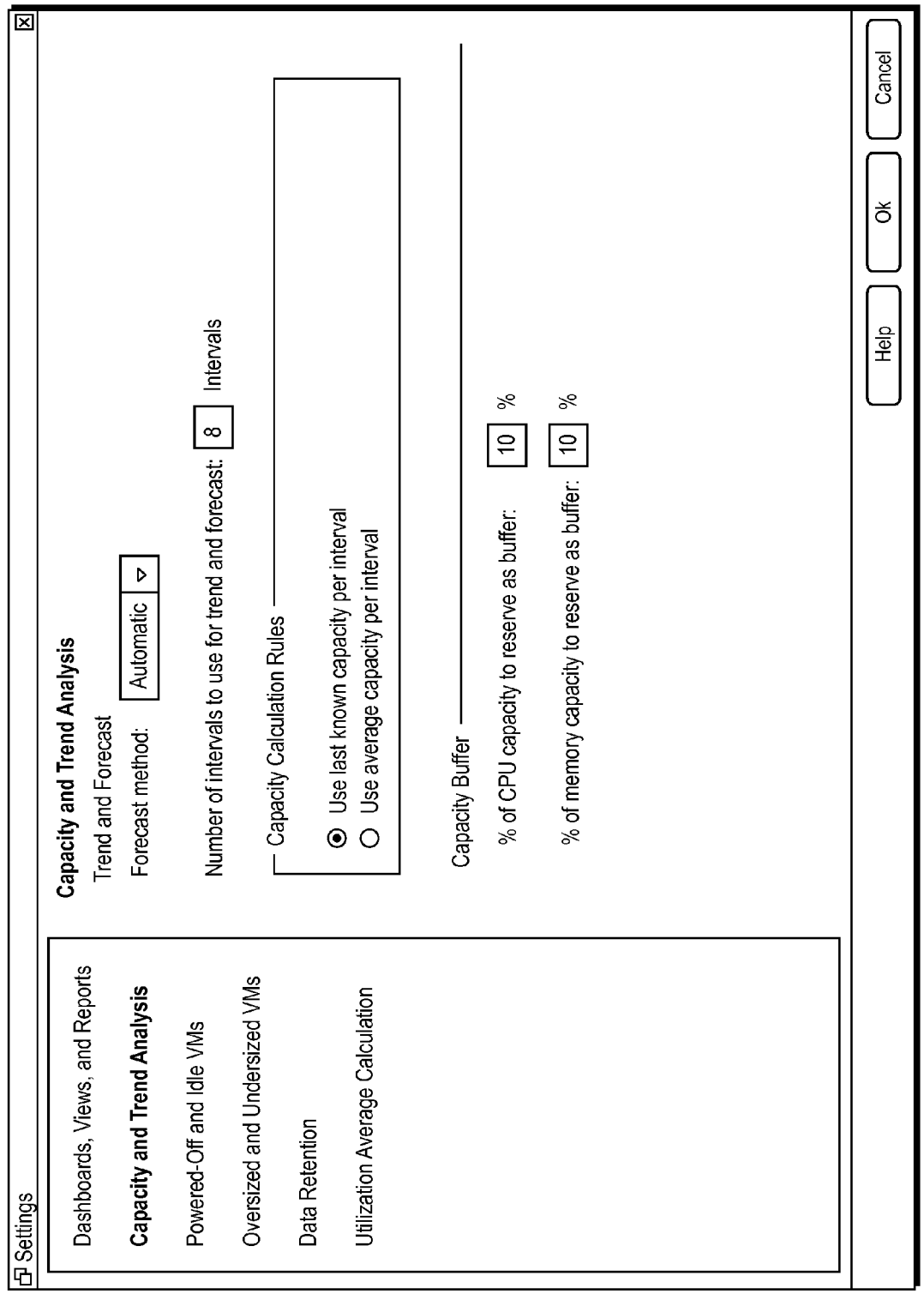
FIG. 28 shows a screenshot that may be used to specify: (a) a trend and forecasting calculation method; (b) a number of time intervals to use in providing the trend and forecast; (c) capacity calculation rules; and (d) a percentage of CPU capacity to use as a reserve buffer and a percentage of memory capacity to use as a reserve buffer.

In addition, and in accordance with one or more embodiments of the present invention, the CLSA tool creates a forecast which provides an estimate of capacity utilization from the present looking forward into the future. In accordance with one or more such embodiments, the user specifies a forecast horizon (i.e., the number of future time intervals for which the forecast is calculated and shown in visualizations of the forecast). In addition, and in accordance with one or more such embodiments, the choice of time interval is user-configurable (i.e., it depends on user settings/preferences). FIG. 28 shows a screenshot that may be used to specify: (a) a trend and forecasting calculation method (for example and without limitation, by fitting data using linear regression analysis, polynomial regression analysis, exponential regression analysis, logarithmic regression analysis, or power regression analysis); (b) a number of time intervals to use in providing the trend and forecast; (c) capacity utilization calculation rules (in accordance with one or more embodiments of the present invention, a user may select "Use average capacity per interval" to have the trend and forecast calculation methods compute an average value (for example, an average value of CPU demand and an average value of memory consumption) for each time interval as data for the regression analysis or the user may select "Use last known capacity per interval" to have the trend or forecast calculation methods use the value of the last measurement for each time interval as data for the regression analysis); and (d) a percentage of total CPU capacity for the capacity container to use as a reserve buffer and a percentage of total memory capacity for the capacity container to use as a reserve buffer.

In accordance with one or more embodiments of the present invention, the CLSA tool calculates: (a) a first trend curve as a function of time for total capacity in a capacity container (using historical data), and (b) a second trend curve as a function of time for total capacity utilization in the capacity container (using historical data). First, in accordance with one or more such embodiments, the total capacity in the capacity container is determined in units of a measure of the number of VMs that can be deployed in the capacity container. In accordance with one or more such embodiments, the measure of the number of VMs that can be deployed is provided by the number of AVM units that can be deployed in the capacity container, where the number of AVM units that can be deployed is determined in the manner described in detail below. Second, in accordance with one or more such embodiments, the total capacity utilization in the capacity container is determined in units of a measure of the number of VMs that cause the capacity utilization in the capacity container. In accordance with one or more such embodiments, the measure of the number of VMs that cause the capacity utilization is provided by the number of AVM units that would cause the capacity utilization in the capacity container, where the number of AVM units that would cause the capacity utilization is determined in the manner described in detail below. Once the first and second trend curves are calculated, they can be displayed as a function of time where future times represent forecasts of total capacity and total capacity utilization in units of a number of AVM units. As one of ordinary skill in the art can ready appreciate, at any particular point of time, the difference between the first and second trend curves represents unused or remaining capacity in terms of the number of additional AVM units that may be deployed in the capacity container. In addition, at a time when the first and second trend curves intersect (if at all), the number of additional AVM units that may be deployed goes to zero. Thus, the time remaining before the capacity container runs out of capacity is the time from the present to the time that the first and second trend curves intersect. In accordance with one or more embodiments of the present invention, the CLSA tool provides a visualization that enables a user to determine whether and when a capacity container will run out of capacity by displaying the first and second trend curves. In light of the above, and in accordance with one or more embodiments of the present invention, a measure of remaining VM capacity is the number of additional AVM units that can be deployed in the capacity container. For example, determining that a cluster of hosts (i.e., servers) has a remaining VM capacity of twelve (12) indicates that sufficient remaining capacity is available in the cluster to accommodate an additional twelve (12) AVM units.

In accordance with one or more embodiments of the present invention, the CLSA tool calculates: (a) a first forecast curve as a function of time for total capacity in the modified capacity container (where the modified capacity container has been modified to include changes supplied by the capacity and/or load model information); and (b) a second forecast curve as a function of time for total capacity utilization in the modified capacity container (where the modified capacity container has been modified to include changes supplied by the capacity and/or load model information). First, in accordance with one or more such embodiments, the total capacity in the capacity container is determined in units of a measure of the number of VMs that can be deployed in the capacity container. In accordance with one or more such embodiments, the measure of the number of VMs that can be deployed is provided by the number of AVM units that can be deployed in the capacity container, where the number of AVM units that can be deployed is determined in the manner described in detail below. Second, in accordance with one or more such embodiments, the total capacity utilization in the capacity container is determined in units of a measure of the number of VMs that cause the capacity utilization in the capacity container. In accordance with one or more such embodiments, the measure of the number of VMs that cause the capacity utilization is provided by the number of AVM units that would cause the capacity utilization in the capacity container, where the number of AVM units that would cause the capacity utilization is determined in the manner described in detail below. Once the first and second forecast curves are calculated, they can be displayed as a function of time where future times represent forecasts of total capacity and total capacity utilization in units of a number of AVM units for the modified capacity container. As one of ordinary skill in the art can ready appreciate, at any particular point of time, the difference between the first and second forecast curves represents unused capacity in terms of the number of additional AVM units that may be deployed in the modified capacity container. In addition, at a time when the first and second forecast curves intersect (if at all), the number of additional AVM units that may be deployed goes to zero. Thus, the time remaining before the modified capacity container runs out of capacity is the time from the present to the time that the first and second forecast curves intersect. In accordance with one or more embodiments of the present invention, the CLSA tool provides a visualization that enables a user to determine whether and when a modified capacity container will run out of capacity by displaying the first and second forecast curves. In light of the above, and in accordance with one or more embodiments of the present invention, a measure of remaining VM capacity is the number of additional AVM units that can be deployed in the modified capacity container. For example, determining that a cluster of hosts (i.e., servers) has a remaining VM capacity of twelve (12) indicates that sufficient remaining capacity is available in the cluster to accommodate an additional twelve (12) AVM units.

Computation of the First and Second Trend Curves

For each time interval specified by the user, the following computations are made to provide data used to compute the first trend curve and the second trend by fitting the data using the user-selected curve fitting method.

Computation of a data point for the First Trend Curve for a particular time interval: Step 1, the total available CPU demand capacity (for example, in units of Hz) is computed as the sum over all CPU cores in the capacity container of CPU core clock speed. Step 2, the total available Memory capacity (for example, in units of MB) is computed as the sum of memory over all memory in the capacity container. Step 3, the CPU demand and the Memory consumption of the AVM unit for the particular time interval is computed as described above. In particular, the CPU demand of the AVM is computed by (i) summing the average of the CPU demand for each VM in the capacity container, and then (ii) dividing by the number of VMs in the capacity container; and the Memory consumption is determined by (i) summing the average of the Memory consumption for each VM in the capacity container over the particular time interval, and then (ii) dividing by the number of VMs in the capacity container. In accordance with one or more further embodiments of the present invention, in accordance with user selection, the historical data used to compute the CPU demand or memory consumption of the AVM unit for the particular time interval may be a data value that is time averaged over the particular interval, as described above, or a "last measured" value in the particular time interval.

Step 4, the total available CPU demand capacity from step 1 above is divided by the CPU demand of the AVM unit, and the total available Memory capacity from step 2 above is divided by the Memory consumption of the AVM unit. In accordance with one or more embodiments of the present invention, the value of the data point for the particular time interval for the first trend curve (representing total capacity) is equal to the smaller of the two results. Alternatively, in accordance with one or more further embodiments of the present invention, the data point may be taken as being equal to the total available CPU demand capacity divided by the CPU demand of the AVM unit or as being equal to the total available Memory capacity divided by the Memory consumption of the AVM unit.

Next, data points for each of the user-specified time intervals are computed, and the CLSA tool computes the first trend curve by fitting the data points using a user-selected curve fitting method.

Computation of a data point for the Second Trend Curve for a particular time interval: Step 1, the total CPU demand (for example, in units of Hz) is computed as the sum of average CPU demand for a VM for the particular time interval over all VMs in the capacity container. Step 2, the total Memory consumption (for example, in units of MB) is computed as the sum of average memory consumption for a VM for the particular time interval over all VMs in the capacity container. Step 3, the CPU demand and the Memory consumption of the AVM unit for the particular time interval is computed as described above. In accordance with one or more further embodiments of the present invention, in accordance with user selection, the historical data used to compute the CPU demand or memory consumption of the AVM unit for the particular time interval may be a data value that is time averaged over the particular interval, as described above, or a "last measured" value in the particular time interval.

Step 4, the total CPU demand from step 1 above is divided by the CPU demand of the AVM unit, and the total Memory consumption from step 2 above is divided by the Memory consumption of the Average VM unit. In accordance with one or more embodiments of the present invention, the value of the data point for the particular time interval for the second trend curve (representing total capacity utilization) is equal to the smaller of the two results. Alternatively, in accordance with one or more further embodiments of the present invention, the data point may be taken as being equal to the total CPU demand divided by the CPU demand of the AVM unit or as being equal to the total Memory consumption divided by the Memory consumption of the AVM unit.

Next, data points for each of the user-specified time intervals are computed, and the CLSA tool computes the second trend curve by fitting the data points using the user selected curve fitting method.

Computation of the First and Second Forecast Curves

Computation of data points for the First Forecast Curve and the Second Forecast Curve are the same as that described above for the first trend curve and the second trend curve, respectively, except that data points for the first forecast curve and the second forecast curve are computed taking into account modifications provided by the capacity and/or load model. In particular, the total available CPU demand capacity, the total CPU demand, the total Memory capacity, the total Memory consumption, the CPU demand of the AVM unit, and the Memory consumption of the AVM unit for each time interval are computed using data for VMs remaining in the modified capacity container and for new VMs that were added to the modified capacity container by the capacity and/or load model. In particular: (a) for existing VMs in the modified capacity container, the data used is the historical data; (b) for a VM added using user-specified attributes, the same attributes (which, if necessary, have been "normalized" in the manner described above) are applied over each time interval since there is no historical data; and (c) for a VM added using existing attributes, the data used is historical data (which, if necessary, have been "normalized" in the manner described above).

Next, the CLSA tool computes the first and second forecast curves by fitting the data points using the user selected curve fitting method.

In accordance with one or more embodiments, in computing first and second trend curves and the first and second forecast curves, the CLSA tool takes into account "unusable" physical capacity, i.e., physical capacity that is not available for use by VMs because it is reserved, for example and without limitation, for one or more of the following: (a) a reserved capacity used to meet "High Availability" (HA) failover commitments when a host failure occurs (High Availability technology is provided by software available from VMware, Inc. of Palo Alto, Calif.)—in accordance with one or more embodiments of the present invention, the reserved capacity for HA is set equal to the entire amount of computer resources (for example, CPU and memory) that are used by the HA enabled VM, in other words, the CPU and memory utilizations are set for that VM are set equal to 100%; (b) a reserved capacity used to meet "Fault Tolerance" ("FT") commitments to mitigate the effects of host failure (Fault Tolerance technology is provided by software available from VMware, Inc. of Palo Alto, Calif.)—in accordance with one or more embodiments of the present invention, the reserved capacity for FT is accounted for by assuming a "shadow" VM is running in parallel with the fault tolerant VM, and as a result, each fault tolerant VM is treated as if it were two VMs where each VM has the same parameters; and (c) a "capacity buffer" (in terms of CPU and memory) set aside as a safety margin against sporadic spikes in demand—the amount of reserved capacity (i.e., the capacity buffer) is user-configurable (i.e., it depends on user settings/preferences); for example, it is useful to leave set the capacity buffer to be 15%-20%.

As one or ordinary skill in the art can readily appreciate, if a user wishes to determine how many more VMs can be deployed for an existing configuration of a capacity container at a particular time in the future, the user would display the first and second trend curves (as described above they are based on the existing configuration) and subtract the values of the first and second trend curves at the particular time. However, if the user wishes to determine how many more VMs can be deployed at a particular time tin the future after a capacity and/or load model is created, the user would display the first and second forecast curves (as described above they are based on the modified capacity container) and subtract the values of the first and second forecast curves at the particular time.

The following describes visualizations provided by one or more embodiments of the CLSA tool in conjunction with FIGS. 23-27. In accordance with one or more embodiments of the present invention, the visualization provided by the CLAS visualization tool helps users (for example and without limitation, datacenter administrators): (a) understand trends in Load and Capacity in their datacenters; and (b) overlay "impact analysis" scenarios consisting of adding additional capacity or load with distinct characteristics. FIGS. 23-27 show the impact of changes that have been provided by the capacity and/or load model simulated by the What-if analysis.

Figure 23:
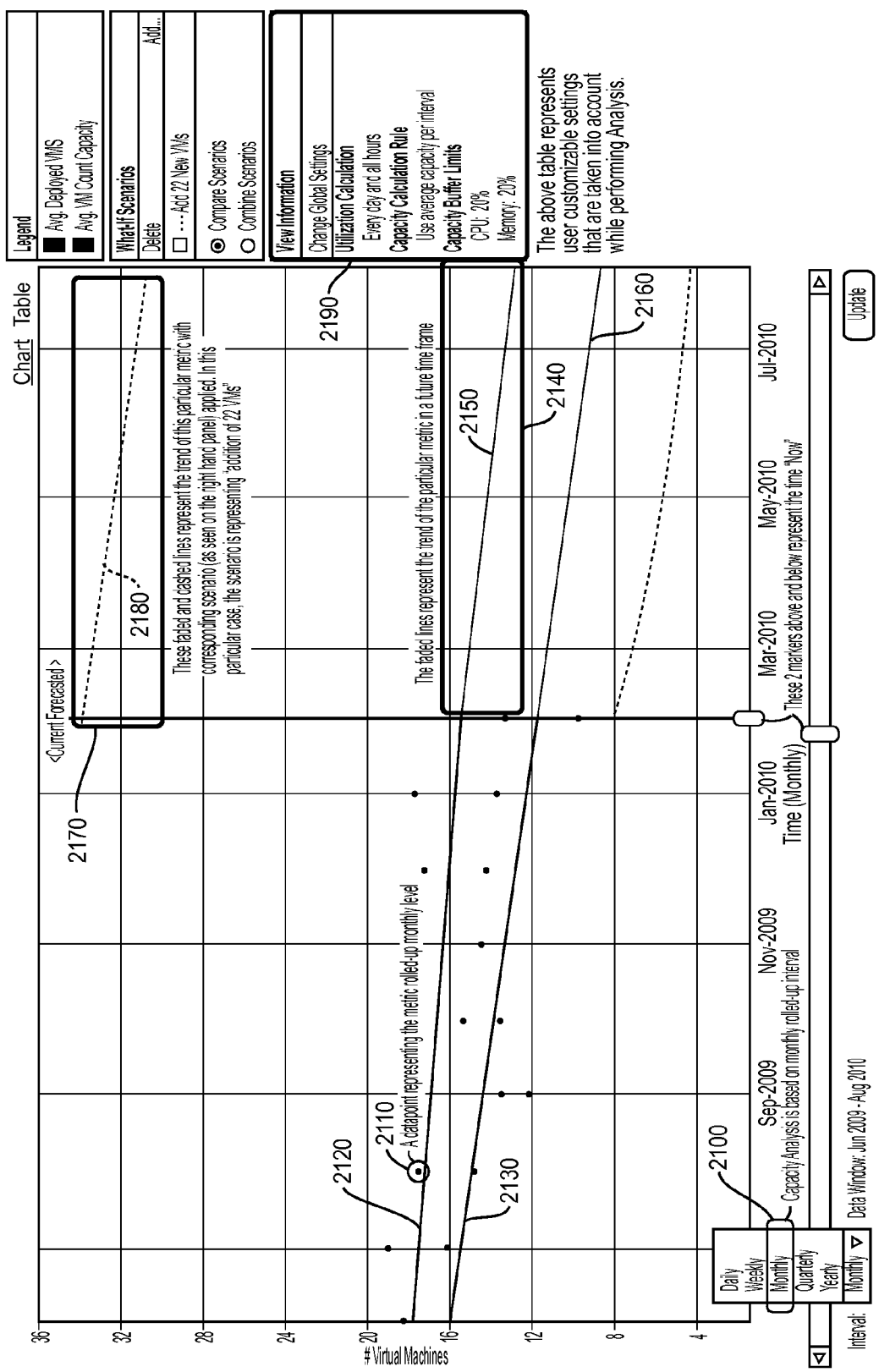
FIGS. 23-27 show visualizations provided by a Capacity and Load Simulation and Analysis ("CLSA") tool in accordance with one or more embodiments of the present invention.

In FIG. 23, the user has selected a monthly interval (see heavily outlined rectangle 2100 in the lower left of FIG. 23) and, as such, each data point (for example, data point 2110 enclosed by the small heavily outlined rectangle in the middle left of FIG. 23) represents one month's data. Upper curve 2120 (is the first trend curve described above) and represents the total capacity in the capacity container (measured in numbers of AVM units), and lower curve 2130 (is the second trend curve described above) and represents the total capacity utilization in the capacity container (measured in numbers of AVM units required to provide that capacity utilization).

Thus, at a particular point in time, the difference between upper curve 2120 and lower curve 2130 on the left represents the remaining capacity in the capacity container (measured in numbers of AVM units that can be deployed into the capacity container).

As further shown in FIG. 23, in lower right hand (heavily outlined) rectangle 2140, faded lines 2150 and 2160, respectively, represent a forecast (using first trend curve 2120 and second trend curve 2130, respectively) of total capacity and total capacity utilization for the capacity container. As further shown in FIG. 23, in upper right hand (heavily outlined) rectangle 2170, dashed curve 2180 (is the first forecast curve described above) and represents the total capacity in the modified capacity container (measured in numbers of AVM units) (i.e., as modified by the capacity and/or container model—in the particular case displayed, the modified capacity container represents the addition of 22 VMs). As further shown in FIG. 23, the lowest curve in the right-hand portion of FIG. 23, dashed curve 2200 (is the second forecast curve described above) and represents the total capacity utilization in the modified capacity container (measured in numbers of AVM units required to provide that capacity utilization). Thus, at a particular point in time, the difference between dashed curve 2180 and dashed curve 2200 on the right represents the remaining capacity in the modified capacity container (measured in numbers of AVM units that can be deployed into the capacity container). Also note the user preferences set forth in heavily outlined rectangle 2190 in the middle right hand portion of FIG. 23.

In accordance with one or more embodiments of the present invention, the user can combine or compare the simulation results of two or more models. To create more models, the user clicks on the "Add" button in FIG. 23, and control is transferred back to the CLM creation tool to create another model. When the new model is created, a new button is created under the "What-if scenarios" label so that a combination may be selected from a multiplicity of models created. After selecting the models to be combined, the user clicks the "Combine Scenarios" radio button shown in FIG. 23, and a simulation is carried out as described above except that all calculations relate to a combination of the models (i.e., there is a modified capacity container comprised of all the changes provided by all the models). In this case, the forecast is visualized as a first and a second forecast curve for the modified container. To compare two models, the user selects the models to be compared and clicks the "Compare Scenarios" radio button shown in FIG. 23. Each model is simulated separately, and the forecast for each model is visualized as a first and a second forecast curve. Thus, in accordance with one or more embodiments of the present invention, the user can create multiple models and compare and combine the simulation results to determine a "best" course of action.

Figure 24:
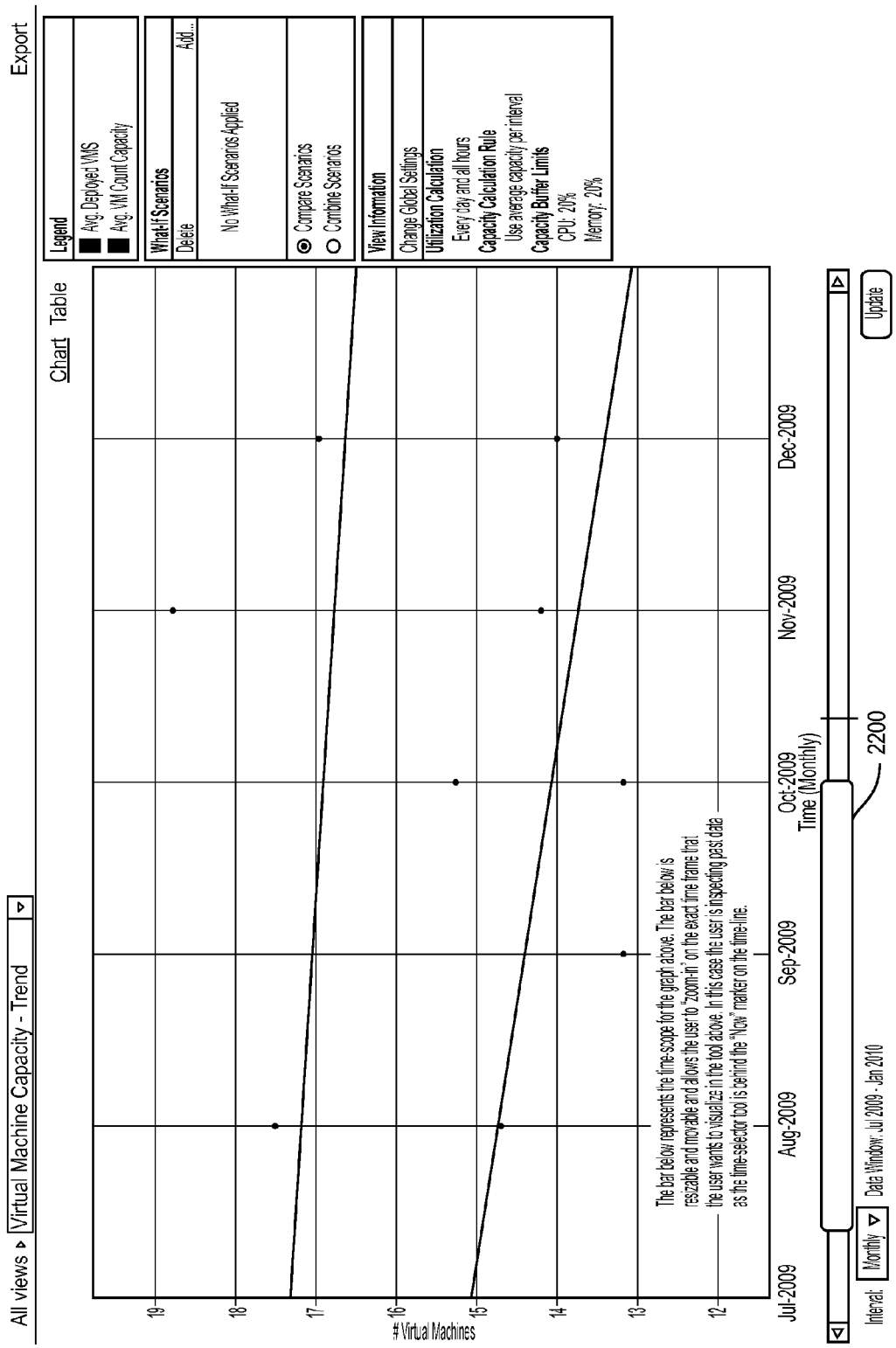

In FIG. 24, bar 2200 disposed below the graph enables a user to change a time-scope for displaying the curves. In accordance with one or more embodiments of the present invention, bar 2200 is resizable (for example, by dragging either or both ends) and movable (for example, by dragging in the body of bar 2200) in accordance with any one of a number of methods that are well known to those of ordinary skill in the art. Thus, a user may use bar 2200 to "zoom-in" on a precise time frame that the user wants to visualize in the graph. In the particular case shown in FIG. 24, the user is inspecting past data since the time-selector tool is behind the "Now" marker on the time-line, as such, no first and second forecast curves are shown.

Figure 25:
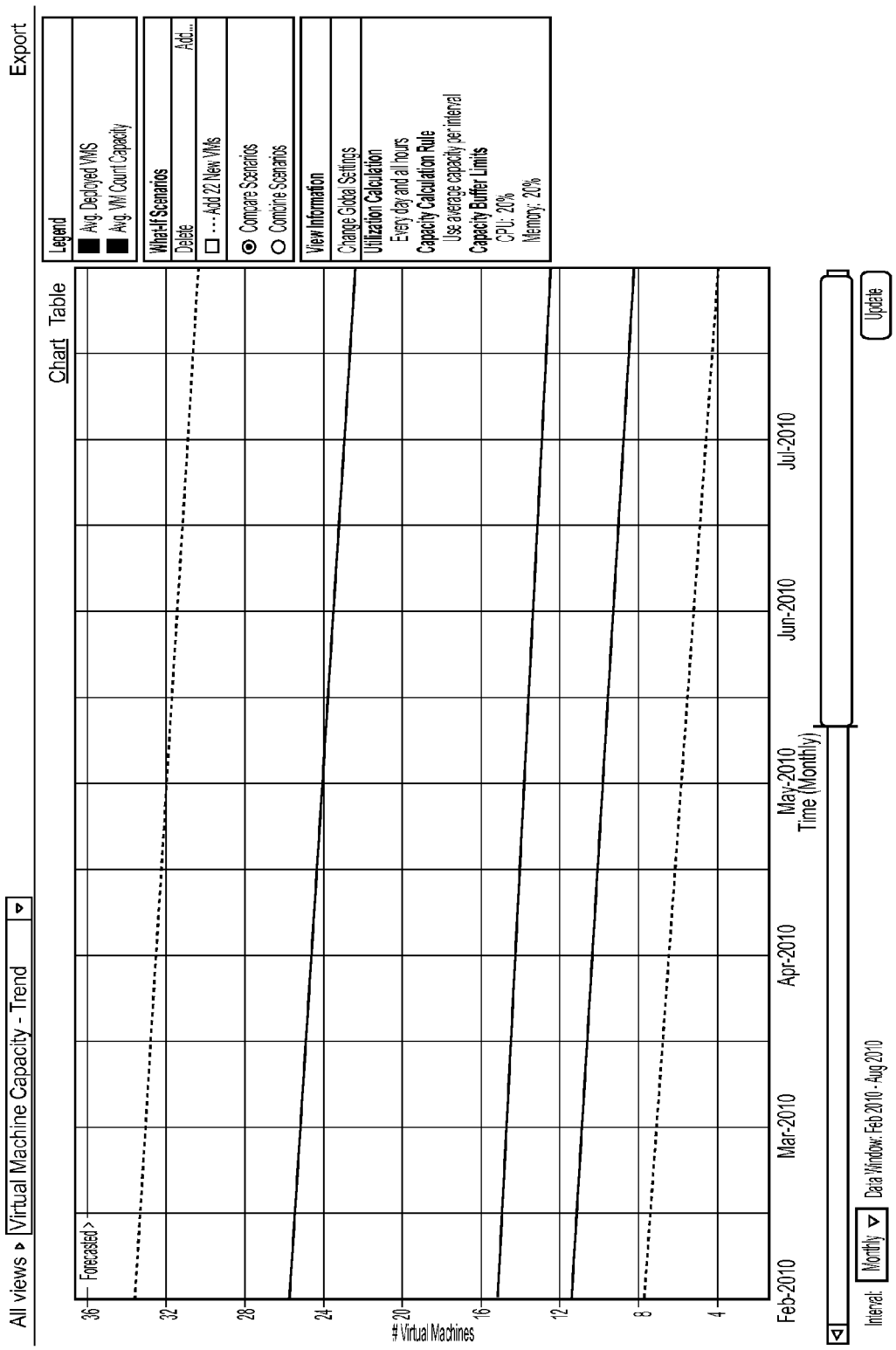

FIG. 25 shows a "time-scope" that covers a "future-only" region, therefore the curves represent forecasts into the future using the first and second trend curves and the first and second forecast curves.

Figure 26:
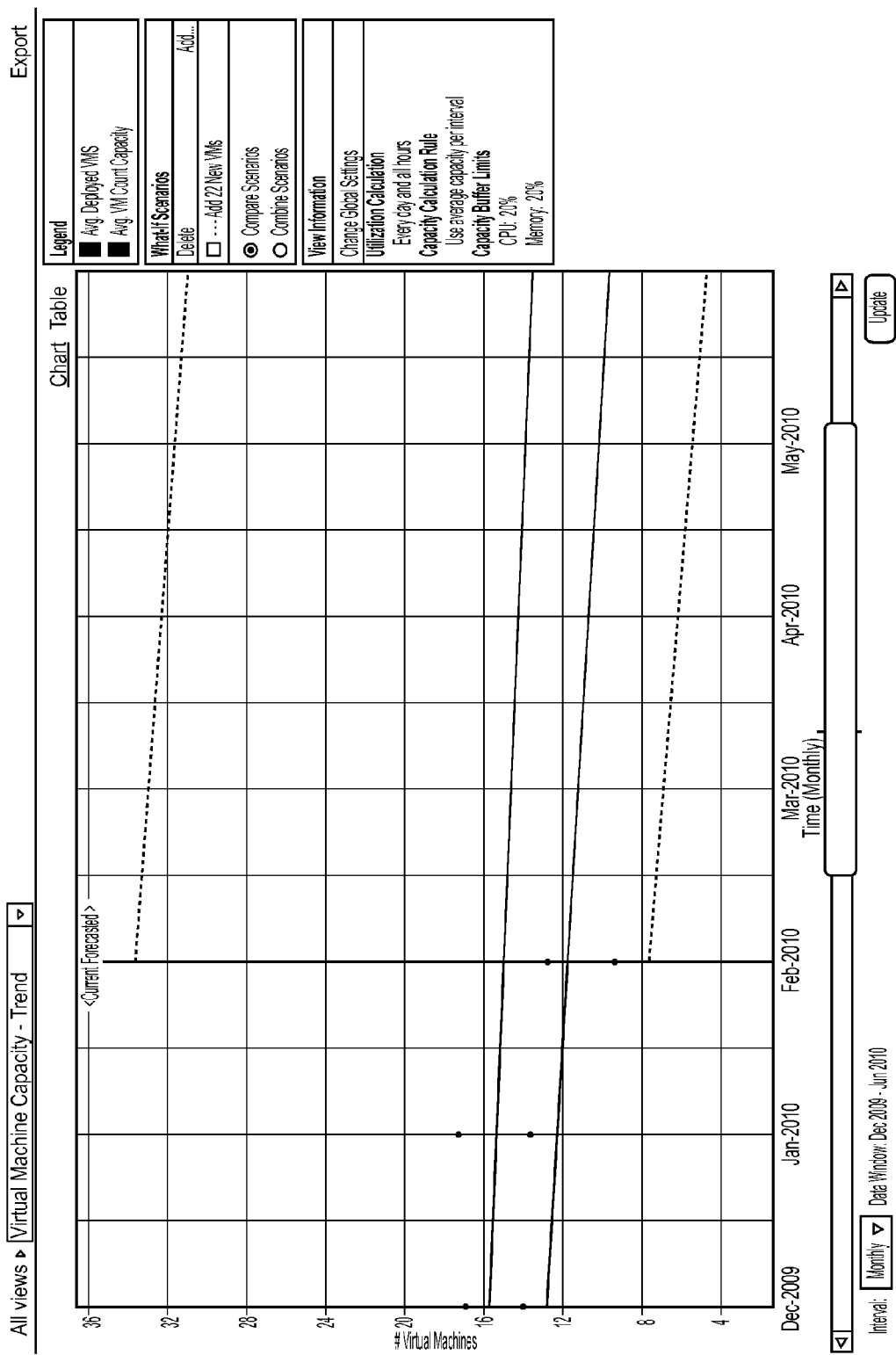

FIG. 26 shows a time scope that covers regions in the past and in the future, i.e., on both sides of the "Now" marker.

Figure 27:
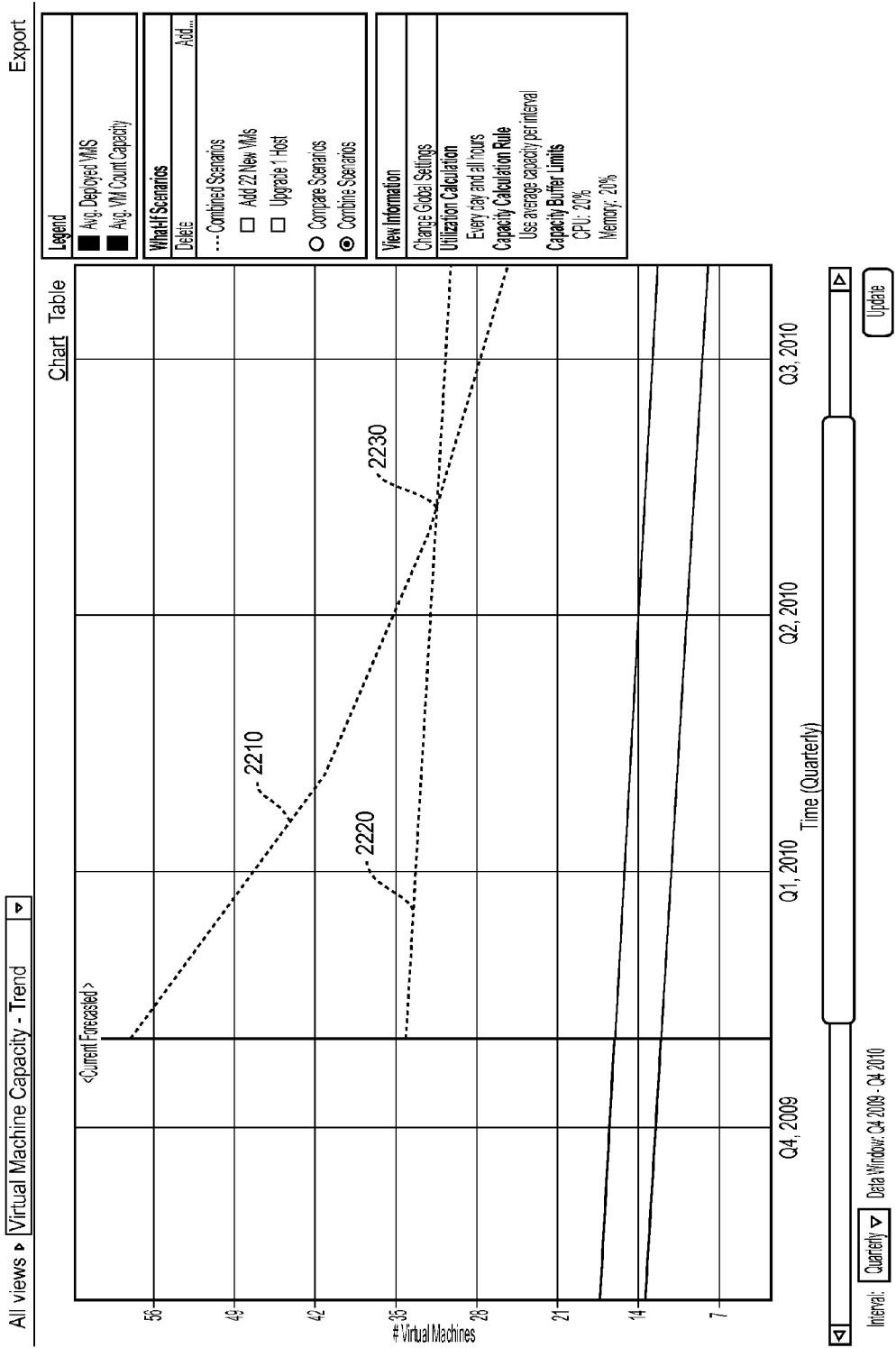

In FIG. 27 the user has changed the roll-up interval to "quarterly" and the time scope covers past and future regions. Intersection point 2230 of lines 2210 and 2220, as described above, represents the point when the capacity container is going to run out of capacity. Since the system is out of capacity it is "under stress" which impacts performance and service-levels of virtualized workloads (i.e. VMs).

One or more embodiments of the present invention, including embodiments described herein, may employ various computer-implemented operations involving data stored in computer systems. For example. these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing. identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments of the present invention, including embodiments described herein, may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Many changes and modifications may be made to the description set forth above by those of ordinary skill in the art while remaining within the scope of the invention. In addition, apparatus, methods and mechanisms suitable for fabricating one or more embodiments of the present invention have been described above by providing specific, non-limiting examples and/or by relying on the knowledge of one of ordinary skill in the art. Apparatus, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described apparatus, methods and mechanisms.

As such, the scope of the invention should be determined with reference to the appended claims along with their full scope of equivalents. Accordingly, the described embodiments are to be considered as exemplary and illustrative and not restrictive, and the scope of the claims is not to be limited to details given herein, but may be modified within the scope and equivalents of the claims. The claim elements and/or steps do not imply any particular order of operation, unless explicitly stated in the claims.

Many changes and modifications may be made to the description set forth above by those of ordinary skill in the art while remaining within the scope of the invention. In addition, materials, methods, and mechanisms suitable for fabricating embodiments of the present invention have been described above by providing specific, non-limiting examples and/or by relying on the knowledge of one of ordinary skill in the art. Materials, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of simulating a capacity and/or load model in a virtualized environment for a capacity container, which method comprises:
    creating a capacity and/or load model;
    collecting existing server and virtual machine (VM) attributes for the capacity container, which attributes include measures of capacity utilization;
    providing a first and second set of historical data for each of a user-selected number of user-selected time intervals prior to and ending at a predetermined time wherein:
        (a) data for the first set in each interval comprises a measure of total capacity in the capacity container in units which are a measure of the number of VMs that can be deployed in the capacity container, wherein the measure of the number of VMs that can be deployed is the number of average virtual machine (AVM) units that can be deployed in the capacity container, and wherein the number of AVM units that can be deployed is determined by dividing a total available CPU demand capacity by a CPU demand of the AVM units and dividing a total available memory capacity by a memory consumption of the AVM units, and utilizing the smaller of the two divisions, and
        (b) data for the second set in each interval comprises a measure of total capacity utilization in the capacity container in units which are a measure of the number of VMs that cause the capacity utilization in the capacity container, wherein the measure of the number of VMs that cause utilization is the number of AVM units that cause the utilization in the capacity container, and wherein the number of AVM units that cause the utilization is determined by dividing total CPU demand by the CPU demand of the AVM units, dividing total memory consumption by the memory consumption of the AVM units, and utilizing the smaller of the two divisions;
    fitting the first and second sets of historical data to provide a first and a second trend curve; and
    visualizing the first and second trend curves.

2. The method of claim 1 which further comprises:
    providing a first and second set of data for each of a user-selected number of user-selected time intervals prior to and ending at a predetermined time wherein:
        (a) data for the first set in each interval comprises a measure of total capacity in the capacity container, as modified by the capacity and/or load model, in units which are a measure of the number of VMs that can be deployed in the capacity container, and
        (b) data for the second set in each interval comprises a measure of the number of VMs that cause capacity utilization in the capacity container, as modified by the capacity and/or load model;
    fitting the first and second sets of data to provide a first and a second forecast curve; and
    visualizing the first and second forecast curves.

3. The method of claim 1 wherein the number of AVM units that can be deployed is determined by dividing the total available CPU demand capacity by the CPU demand of the AVM units or by dividing a total available memory capacity by the memory consumption of the AVM units; and
    the number of AVM units that cause the utilization is determined by dividing the total CPU demand by the CPU demand of the AVM units or by dividing the total memory consumption by the memory consumption of the AVM units.

4. The method of claim 2 wherein the measure of the number of VMs that can be deployed is the number of average virtual machine (AVM) units that can be deployed in the capacity container; and
    the measure of the number of VMs that cause utilization is the number of AVM units that cause the utilization in the capacity container.

5. The method of claim 4 wherein the number of AVM units that can be deployed is determined by dividing the total available CPU demand capacity by the CPU demand of the AVM units and dividing a total available memory capacity by the memory consumption of the AVM units, and utilizing the smaller of the two divisions; and
    the number of AVM units that cause the utilization is determined by dividing the total CPU demand by the CPU demand of the AVM units, dividing the total memory consumption by the memory consumption of the AVM units, and utilizing the smaller of the two divisions.

6. The method of claim 4 wherein the number of AVM units that can be deployed is determined by dividing the total available CPU demand capacity by the CPU demand of the AVM units or by dividing a total available memory capacity by the memory consumption of the AVM units; and the number of AVM units that cause the utilization is determined by dividing the total CPU demand by the CPU demand of the AVM units or by dividing the total memory consumption by the memory consumption of the AVM units.

7. The method of claim 1 wherein a capacity container is one of a datacenter, a server, a cluster of servers, or a virtualized resource pool.

8. The method of claim 1 wherein at least one of the time intervals is one of a day, a week, a month and three months.

9. The method of claim 1 wherein fitting includes using one of linear regression analysis, polynomial regression analysis, exponential regression analysis, logarithmic regression analysis, and power regression analysis.

10. The method of claim 1 wherein the data for the first set and the second set for each time interval is an average of the data over the time interval.

11. The method of claim 1 wherein the data for the first set and the second set for each time interval is a last measured value for the time interval.

12. The method of claim 2 wherein capacity container is one of a datacenter, a server, a cluster of servers, or a virtualized resource pool.

13. The method of claim 2 wherein the time interval is one of a day, a week, a month and three months.

14. The method of claim 2 wherein fitting includes using one of linear regression analysis, polynomial regression analysis, exponential regression analysis, logarithmic regression analysis, and power regression analysis.

15. The method of claim 2 wherein the data for the first set and the second set for each time interval is an average of the data over the time interval.

16. The method of claim 2 wherein the data for the first set and the second set for each time interval is a last measured value for the time interval.

17. The method of claim 1 wherein providing the first and second set of historical data comprises utilizing VMs enabled with a Fault Tolerant feature.

18. The method of claim 1 wherein providing the first and second set of historical data comprises utilizing VMs enabled with a High Availability feature.

19. The method of claim 1 wherein providing the first and second set of historical data comprises utilizing a reserve buffer.

20. The method of claim 2 wherein providing the first and second set of data comprises utilizing VMs enabled with a Fault Tolerant feature.

21. The method of claim 2 wherein providing the first and second set of data comprises utilizing VMs enabled with a High Availability feature.

22. The method of claim 2 wherein providing the first and second set of data comprises utilizing a reserve buffer.

* * * * *